US009528021B2

(12) United States Patent
Low et al.

(10) Patent No.: US 9,528,021 B2
(45) Date of Patent: Dec. 27, 2016

(54) WATER-FREE HIGH-SOLIDS BASE PAINTS, THE PRODUCTION THEREOF AND THE USE THEREOF FOR PRODUCING MULTILAYER PAINT COATINGS, AND MULTILAYER PAINT COATINGS COMPRISING A BASE COATING MADE OF A WATER-FREE HIGH-SOLIDS BASE PAINT

(75) Inventors: Norbert Low, Neustadt/Aisch (DE); Veronika Duchnik, Himmelstadt (DE); Jorn Lavalaye, Wurzburg (DE)

(73) Assignee: BASF Coatings GmbH, Muenster (DE)

( * ) Notice: Subject to any disclaimer, the term of this patent is extended or adjusted under 35 U.S.C. 154(b) by 380 days.

(21) Appl. No.: 13/265,737

(22) PCT Filed: Apr. 21, 2010

(86) PCT No.: PCT/EP2010/002430
§ 371 (c)(1),
(2), (4) Date: Oct. 21, 2011

(87) PCT Pub. No.: WO2010/121791
PCT Pub. Date: Oct. 28, 2010

(65) Prior Publication Data
US 2012/0034457 A1    Feb. 9, 2012

(30) Foreign Application Priority Data

Apr. 21, 2009  (DE) .................. 10 2009 018 217

(51) Int. Cl.
| B32B 15/09 | (2006.01) |
| B32B 27/36 | (2006.01) |
| B32B 5/00 | (2006.01) |
| C09D 167/02 | (2006.01) |
| C09D 7/12 | (2006.01) |
| C09D 133/04 | (2006.01) |
| C09D 133/08 | (2006.01) |
| C08K 5/29 | (2006.01) |
| C08L 67/00 | (2006.01) |

(52) U.S. Cl.
CPC .............. C09D 133/08 (2013.01); C08K 5/29 (2013.01); C08L 67/00 (2013.01); Y10T 428/265 (2015.01); Y10T 428/31681 (2015.04); Y10T 428/31786 (2015.04)

(58) Field of Classification Search
CPC ..... B05D 7/53; B05D 2401/32; C09D 167/00; C09D 5/36; C09D 7/12; C09D 167/02; C09D 133/04; C08L 23/00; C08L 2666/04; C08L 67/02; B32B 15/09; B32B 27/36; B32B 5/00
USPC ......... 524/502, 162, 513; 428/336, 480, 458
See application file for complete search history.

(56) References Cited

U.S. PATENT DOCUMENTS

| 3,479,328 A | 11/1969 | Nordstrom et al. |
| 3,674,838 A | 7/1972 | Nordstrom |
| 4,126,747 A | 11/1978 | Cowherd, III et al. |
| 4,184,025 A | 1/1980 | Chattha |
| 4,279,833 A | 7/1981 | Culbertson et al. |
| 4,281,075 A | 7/1981 | Chattha |
| 4,340,497 A | 7/1982 | Knopf |
| 4,369,283 A * | 1/1983 | Altschuler .................... 524/451 |
| 4,369,301 A | 1/1983 | Konig et al. |
| 4,397,989 A * | 8/1983 | Adesko ........................ 525/162 |
| 4,504,372 A | 3/1985 | Kirchmayr et al. |
| 4,522,958 A | 6/1985 | Das et al. |
| 4,835,227 A * | 5/1989 | Mormile ....................... 525/509 |
| 4,843,126 A | 6/1989 | Quinn |
| 5,102,961 A | 4/1992 | Blank |
| 5,112,931 A | 5/1992 | Potter et al. |
| 5,288,820 A | 2/1994 | Rector, Jr. et al. |
| 5,525,670 A | 6/1996 | Nishi et al. |
| 5,552,184 A | 9/1996 | Klostermann et al. |
| 5,852,120 A | 12/1998 | Bederke et al. |
| 5,852,137 A | 12/1998 | Hsieh et al. |
| 5,962,574 A | 10/1999 | Jackson et al. |
| 6,043,316 A | 3/2000 | St. Clair |
| 6,146,706 A | 11/2000 | Verardi et al. |

(Continued)

FOREIGN PATENT DOCUMENTS

| CN | 1212270 | 3/1999 |
| CN | 1353646 A | 6/2002 |

(Continued)

OTHER PUBLICATIONS

International Search Report for International application No. PCT/EP2010/002430 dated Aug. 23, 2010.

(Continued)

Primary Examiner — James J Seidleck
Assistant Examiner — Deve E Valdez
(74) Attorney, Agent, or Firm — Servilla Whitney LLC

(57) ABSTRACT

A waterless high-solids basecoat material having a solids content of at least 35% by weight, comprising (a) 1% to 10% by weight of at least one polyester binder with an acid number of at least 20 mg KOH/g, (b) 10% to 30% by weight of at least one acrylate binder, (c) 12% to 30% by weight of at least one kind of polymer microparticles, (d) 9.5% to 30% by weight of at least one crosslinking agent selected from free isocyanates, blocked isocyanates, and amino resins, (e) 1% to 3% by weight of at least one sulfonic acid catalyst, (f) 1% to 35% by weight of at least one pigment, (g) 30% to 65% by weight of at least one organic solvent, and (h) 0.5% to 47% by weight of at least one auxiliary or additive, based in each case on the total weight of the basecoat material.

20 Claims, No Drawings

(56) References Cited

U.S. PATENT DOCUMENTS

| | | | |
|---|---|---|---|
| 6,203,913 B1 | 3/2001 | Kondos et al. | |
| 6,204,332 B1 | 3/2001 | Wilfinger et al. | |
| 6,649,734 B2 | 11/2003 | Campbell et al. | |
| 7,619,019 B2 | 11/2009 | Drescher et al. | |
| 2003/0190434 A1 | 10/2003 | Byers et al. | |
| 2003/0232222 A1 | 12/2003 | Anderson et al. | |
| 2004/0077778 A1 | 4/2004 | Hazan et al. | |
| 2005/0100740 A1 | 5/2005 | Lin et al. | |
| 2006/0147745 A1 | 7/2006 | Choi et al. | |
| 2006/0188735 A1* | 8/2006 | Reising | 428/458 |
| 2007/0055038 A1 | 3/2007 | Gimmnich et al. | |
| 2007/0110902 A1 | 5/2007 | Johnson et al. | |
| 2008/0076868 A1 | 3/2008 | Green et al. | |
| 2009/0162592 A1 | 6/2009 | Baikerikar et al. | |
| 2009/0304937 A1* | 12/2009 | Morgan | 427/384 |

FOREIGN PATENT DOCUMENTS

| | | |
|---|---|---|
| DE | 69406733 T2 | 3/1998 |
| DE | 60223369 T2 | 9/2008 |
| EP | 0027719 A1 | 4/1981 |
| EP | 0086085 A2 | 8/1983 |
| EP | 0217385 A2 | 4/1987 |
| EP | 0217385 | 1/1991 |
| EP | 0377931 B1 | 11/1993 |
| EP | 0480959 B1 | 9/1994 |
| EP | 0787159 B1 | 12/1998 |
| EP | 1185568 B1 | 12/2002 |
| EP | 1173491 B1 | 12/2003 |
| EP | 1538171 A1 | 6/2005 |
| EP | 1940977 A2 | 7/2008 |
| GB | 148182 A | 1/1922 |
| JP | S62-79873 | 4/1987 |
| JP | S6448865 | 2/1989 |
| JP | H10-273620 | 10/1998 |
| JP | 2001002736 | 1/2001 |
| JP | 2002113419 | 4/2002 |
| JP | 2006-283021 | 10/2006 |
| WO | WO96/24619 A1 | 8/1996 |
| WO | WO99/42529 A1 | 8/1999 |
| WO | WO99/42531 A1 | 8/1999 |
| WO | WO01/25307 A1 | 4/2001 |
| WO | WO01/72909 A2 | 10/2001 |
| WO | WO01/81483 A2 | 11/2001 |
| WO | WO03/050194 A1 | 6/2003 |
| WO | WO03/089477 A1 | 10/2003 |
| WO | WO03/089487 A1 | 10/2003 |
| WO | WO2004014991 * | 2/2004 |
| WO | WO2005/033233 A2 | 4/2005 |
| WO | WO2005/046889 A1 | 5/2005 |
| WO | WO2005/105938 A1 | 11/2005 |
| WO | WO2006/062666 A1 | 6/2006 |
| WO | WO2006/063304 A1 | 6/2006 |
| WO | WO2007/008635 A1 | 1/2007 |
| WO | WO2007/044774 A2 | 4/2007 |
| WO | WO2008/021712 A2 | 2/2008 |
| WO | WO2008/058590 A1 | 5/2008 |
| WO | WO2008/100548 A1 | 8/2008 |
| WO | WO2009/045466 A1 | 4/2009 |

OTHER PUBLICATIONS

International Search Report for International application No. PCT/EP2010/002434 dated Jan. 7, 2011.
International Search report for International application No. PCT/EP2010/002439 dated Sep. 3, 2010.
Written Opinion for International application No. PCT/EP2010/002430.
Written Opinion for International application No. PCT/EP2010/002434.
Written Opinion for International application No. PCT/EP2010/002439.
International Preliminary Report on Patentability for International application No. PCT/EP2010/002430 dated Nov. 1, 2011.
International Preliminary Report on Patentability for International application No. PCT/EP2010/002434 dated Nov. 1, 2011.
International Preliminary Report on Patentability for International application No. PCT/EP2010/002439 dated Nov. 1, 2011.

* cited by examiner

WATER-FREE HIGH-SOLIDS BASE PAINTS, THE PRODUCTION THEREOF AND THE USE THEREOF FOR PRODUCING MULTILAYER PAINT COATINGS, AND MULTILAYER PAINT COATINGS COMPRISING A BASE COATING MADE OF A WATER-FREE HIGH-SOLIDS BASE PAINT

CROSS REFERENCE TO RELATED APPLICATIONS

This application is a National Phase Application of Patent Application PCT/EP2010/002430 filed on 21 Apr. 2010, which claims priority to DE102009018217.9, filed 21 Apr. 2009, both of which are hereby incorporated by reference in their entirety.

FIELD OF THE INVENTION

The present invention relates to waterless high-solids basecoat materials, to their preparation, and to their use for producing multicoat paint systems, and also to multicoat paint systems comprising a basecoat of a waterless high-solids basecoat material.

BACKGROUND OF THE INVENTION

The well-established solventborne, waterless coating compositions, especially those known as basecoat and clearcoat materials, and the single-coat or multicoat color and/or effect paint systems produced using them have very good performance properties.

However, the continually growing technical and aesthetic demands of the market, particularly the demands of the automobile manufacturers and their customers, require continual onward development of the technical and aesthetic level attained so far.

In particular there is a need to provide new coating compositions which even at low film thickness exhibit high hiding power and which at the same time are suitable for producing multicoat paint systems having good performance properties, especially good adhesive strength and good stonechip resistance. At the same time, however, the advantages acquired by virtue of the known basecoat and clearcoat materials and the multicoat paint systems produced from them are not to be lost, but instead are to be retained at least to the same extent and preferably to a greater extent.

Multicoat paint systems composed of basecoat and clearcoat are widespread in the automobile industry. Multicoat paint systems can be produced by first applying a basecoat material and, after a brief flash-off time, without a baking step (wet-on-wet method), applying a clearcoat material over the basecoat film, and then baking basecoat and clearcoat together. In the case of the innovative 3-wet coating methods, a basecoat is applied as a primer substitute; after a brief flash-off time, a further basecoat material is applied over it, and, after a further brief flash-off time, without a baking step (wet-on-wet-on-wet method), a clearcoat material is applied. Subsequently all three films (basecoat I+II and clearcoat) are baked jointly. Examples of 3-wet methods are described in WO 2006/062666 and in application EP 1940977.

Multicoat paint systems are used on account of their outstanding profiles of properties, such as scratch resistance, chemical resistance, and weather resistance, and also high gloss. For reasons of environmental protection, furthermore, there is a need to provide coating compositions having a lower and lower solvent content and hence a higher and higher solids content (high solids).

High-solids clearcoat materials which comply with the limits for volatile organic compounds (VOC) and which possess the high scratch resistance the customer demands are based predominantly on carbamate-containing binder systems, which in combination with monomeric crosslinking resins such as hexa(methoxymethyl)melamine (HMMM) or melamines with mixed etherification, and with polymerized binders, form a dense network. The volatile organic compounds (VOC) embrace the solvents and also volatile elimination products from film-forming reactions (cf. Römpp Lexikon Lacke and Druckfarben, Georg Thieme Verlag Stuttgart/New York 1998, ISBN 3-13-776001-1, page 612, entry heading "Volatile organic compounds" (VOC)).

The basecoat materials in the multicoat paint systems typically comprise a binder and a crosslinking agent. The binder frequently possesses hydroxy-functional groups on a polymeric network. Crosslinking agents used are typically monomeric crosslinking resins such as hexa(methoxymethyl)melamine (HMMM) or melamines with mixed etherification.

WO 2008/058590 A1 describes pigmented coating compositions comprising at least one inorganic particle (N) having a primary particle size of 1 to 800 nm, at least one binder (B), at least one color and/or effect pigment, and also one or more organic solvents, the inorganic particles (N) being at least partly modified with a stabilizer (S), which contains groups (S1), which are able to interact with the surface of the inorganic particles (N), and contains one or more hydrophobic substructures, the coating composition characteristically further comprising at least one wax or a waxlike compound (W). The document additionally describes the use of the pigmented coating compositions for producing multicoat paint systems, and also their use, and also a method of improving the flop of multicoat paint systems by using the pigmented coating compositions. Various binders (B) can be used. The paint systems obtained in this way have a particularly strongly pronounced light/dark behavior (metallic flop).

Nowadays, solventborne waterless high-solids basecoat materials are applied with a dry film thickness of around 16-20 µm, whereas, in the coating of waterborne basecoat materials, a film thickness of only 10-12 µm is customary. Reducing the basecoat film thickness to 10-12 µm can lead, in the case of solventborne basecoat materials, to a reduction in VOC emissions of 5 g per square meter of coated surface area.

However, reducing the dry film thickness of such basecoats frequently leads to a deterioration in the process stability, the hue stability, the substrate masking, and the further properties of the basecoat. In particular there are reductions in the hiding power of the coating film, the adhesive strength, and the stonechip resistance when the film thickness is reduced.

In order to improve the hiding power it is possible to raise the pigment content of the coating material. One measure of this is the pigment/binder ratio (p/b). The higher the p/b, the higher the pigment content of the basecoat formulation. Raising the pigment content, however, frequently leads to a further deterioration in the adhesive strength and the stonechip resistance of the coating.

Therefore it is necessary to develop high-solids waterless basecoat materials which even at low film thicknesses exhibit high hiding power in conjunction with good adhesive strength and stonechip resistance on the part of the coating, while exhibiting no other processing, application or technological problems and being suitable for automotive OEM finishing and also for automotive refinish.

The problem on which the present invention was based, therefore, was that of providing high-solids waterless basecoat materials from which coatings can be obtained that even at a low film thickness have a high hiding power in conjunction with high adhesive strength and high stonechip resistance.

It is particularly important to obtain a balanced tradeoff between adhesive strength and stonechip resistance on the one hand and good hiding power at low film thickness on the other hand.

In particular this ought also to be ensured for waterless basecoat materials having a relatively high solids content and pigment/binder ratio at spray viscosity.

Furthermore, the advantages achieved by means of the known high-solids basecoat and clearcoat materials, and the basecoats and clearcoats and multicoat paint systems produced from them, such as good flow, low bit count, and high consistency of hue, ought not to be lost but instead ought to be retained at least to the same extent and preferably to a greater extent.

The resulting paint systems ought in particular to exhibit very little haze, if any, and to have a very good overall visual appearance. Furthermore, the paint systems ought to be free from film defects such as mudcracking, clouds (areas of light/dark shading), and bits. Furthermore, the paint systems ought not to exhibit optical defects such as sanding marks, for example.

The intention was, further, to provide a process for preparing a waterless high-solids basecoat material that meets the above requirements.

Furthermore, the intention was to provide a multicoat paint system and also a process for producing it that exhibits the above advantages.

It was further intended that substrates of metal and/or plastic should be provided, coated with the multicoat paint system.

SUMMARY OF THE INVENTION

Surprisingly it has been found that the problem can be solved by a waterless high-solids basecoat material having a solids content of at least 35% by weight, containing
  a. 1% to 10% by weight of at least one polyester binder which has an acid number of at least 20 mg KOH/g,
  b. 10% to 30% by weight of at least one acrylate binder,
  c. 9.5% to 30% by weight of at least one crosslinking agent which is selected from the group of free isocyanates, blocked isocyanates, and amino resins,
  d. 1% to 3% by weight of at least one sulfonic acid catalyst,
  e. 1% to 35% by weight of at least one pigment,
  f. 30% to 65% by weight of at least one organic solvent, and
  g. 0.5% to 47% by weight of at least one auxiliary or additive, based in each case on the total weight of the basecoat material.

The present invention further provides a process for preparing this basecoat material. This basecoat material can be prepared by mixing and homogenizing the constituents.

The basecoat materials of the invention have good storage stability, which means that even on storage of the coating compositions for 3 days at 60° C. there was no significant deterioration in the properties either of the coating compositions or of the coatings produced from these stored coating compositions, and more particularly there was no deterioration in the rheological properties of the basecoat materials.

The present invention further provides for the use of this basecoat material to produce a multicoat paint system, and also for a corresponding process for producing a multicoat paint system. For this process, first the basecoat material and then at least one clearcoat material are applied to an optionally precoated substrate.

The invention further provides the multicoat paint systems which are obtainable by this process and which comprise at least one basecoat of the basecoat material of the invention and at least one clearcoat.

It was particularly surprising that, even at a low basecoat film thickness, these multicoat paint systems of the invention exhibit good hiding power and in particular at the same time good adhesive strength and good stonechip resistance as well.

The multicoat paint systems of the invention, moreover, have good haze, i.e., no haze, good flow, and also a very good overall visual appearance. Furthermore, the paint systems are free from film defects, such as mudcracking, clouds (areas of light/dark shading), and bits, and show no sanding marks.

Finally, the multicoat paint systems of the invention meet the requirements typically imposed on an automobile finish.

The invention additionally provides substrates of metal and/or plastic which have been coated with at least one basecoat material of the invention.

DETAILED DESCRIPTION OF THE INVENTION

Particular embodiments of the invention are described by the dependent claims.

Waterless High-Solids Basecoat Materials

The waterless high-solids basecoat material of the invention has a solids content of at least 35% by weight. The solids content of the basecoat and clearcoat materials is determined in accordance with DIN ISO 3251 with an initial mass of 1.0 g for a test period of 60 minutes at a temperature of 125° C. The solids content of the basecoat material is preferably at least 40% by weight.

The waterless high-solids basecoat material of the invention comprises at least
  a polyester binder (PE)
  an acrylate binder (AC)
  a crosslinking agent (V)
  a catalyst (K)
  a pigment (P)
  an organic solvent (L)
  an auxiliary or additive (Z).

The individual constituents are described below.

Binder

The basecoat material of the invention may be physically curing. For the purposes of the present invention the term "physical curing" denotes the curing of a layer of a coating composition by filming as a result of loss of solvent from the coating composition, with linking within the coating taking place via looping of the polymer molecules of the binders (regarding the term cf. Römpp Lexikon Lacke und Druckfarben, pages 73 and 74, entry heading "Bindemittel" [Binders]). Or else filming takes place by way of the coalescence of binder particles (cf. Römpp Lexikon Lacke und Druckfarben, pages 274 and 275, entry heading "Härtung" [Curing]). Typically no crosslinking agents are necessary for this purpose. Where appropriate, the physical curing may be assisted by atmospheric oxygen, by heat or by exposure to actinic radiation.

The basecoat material of the invention may be thermally curable. In this case the binder may be self-crosslinking or externally crosslinking. For the purposes of the present invention the term "self-crosslinking" identifies the capacity of a binder to enter into crosslinking reactions with itself. A prerequisite for this is that the binders already include both kinds of complementary reactive functional groups which are needed for crosslinking, or else the binder contains reactive functional groups which are able to react "with themselves". Externally crosslinking coating compositions, on the other hand, are those in which one kind of the complementary reactive functional groups is present in the binder, and the other kind is present in a crosslinking agent. For further details on this refer to Römpp Lexikon Lacke und Druckfarben, Georg Thieme Verlag, Stuttgart, N.Y., 1998, "Härtung" [Curing], pages 274 to 276, especially page 275, bottom.

Polyester Binder (PE)

By polyester binders (PE) are meant polyester resins.

The basecoat material of the invention contains 1% to 10% by weight, based on the total weight of the basecoat material, of at least one polyester binder (PE) which has an acid number of at least 20 mg KOH/g. The acid number is determined in accordance with DIN 53402 and relates to the solids of the polyester resin.

Preferably the basecoat material of the invention contains 2% to 8% by weight, more preferably 3% to 6% by weight, based in each case on the total weight of the basecoat material, of at least one polyester binder (PE) which has an acid number of at least 20 mg KOH/g.

Suitable polyester resins (PE) may be saturated or unsaturated, especially saturated. By unsaturated polyester resins are meant those which comprise at least one polymerizable carbon-carbon double bond. Saturated polyester resins are those which contain no polymerizable carbon-carbon double bond.

Preferably the polyester binders (PE) have a weight-average molecular weight of 400 to 6000 g/mol. The molecular weight is determined by means of GPC analysis with THF (+0.1% of acetic acid) as eluent (1 ml/min) on a styrene-divinylbenzene column combination. Calibration is carried out with polystyrene standards.

Polyester resins (PE) can be prepared by esterifying organic dicarboxylic acids or their anhydrides with organic diols, or derive from a hydroxycarboxylic acid or a lactone. Preferably the polyester resins (PE) are prepared by esterifying organic dicarboxylic acids or their anhydrides with organic diols. The preferred polyester resins (PE) therefore comprise structural units which originate from aliphatic, cycloaliphatic and/or aromatic dicarboxylic and/or polycarboxylic acids and from diols and/or polyols. In order to prepare branched polyester resins it is possible to a small extent also to use polyols or polycarboxylic acids having a functionality of greater than 2. The dicarboxylic and/or polycarboxylic acids and diols and/or polyols may be linear or branched aliphatic, cycloaliphatic or aromatic dicarboxylic and/or polycarboxylic acids or diols and/or polyols.

Diols suitable for preparing the polyester resins are, for example, alkylene glycols, such as ethylene glycol, propylene glycol, butylene glycol, butane-1,4-diol, hexane-1,6-diol, neopentyl glycol, and other diols, such as dimethylolcyclohexane. It is, however, also possible to have small amounts of polyols, such as trimethylolpropane, glycerol, and pentaerythritol, for example. The acid component of the polyester is composed primarily of low molecular mass dicarboxylic acids or their anhydrides having 2 to 44, preferably 4 to 36, carbon atoms in the molecule. Suitable acids are, for example, o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides where they exist. In the formation of polyester polyols it is also possible to use relatively small amounts of carboxylic acids having three or more carboxyl groups, examples being trimellitic anhydride or the adduct of maleic anhydride with unsaturated fatty acids.

It is also possible to use polyester diols which are obtained by reacting a lactone with a diol. They are notable for the presence of terminal hydroxyl groups and repeating polyester fractions of the formula $(-CO-(CHR^2)_n-CH_2-O)$. In this formula n is preferably 4 to 12 and the substituent $R^2=$ in each case independently hydrogen or an alkyl, cycloalkyl or alkoxy radical. Preferably none of the substituents $R^2$ contains more than 12 carbon atoms. Examples are hydroxycaproic acid, hydroxybutyric acid, hydroxydecanoic acid and/or 12-hydroxystearic acid.

For the preparation of the polyester diols the unsubstituted ε-caprolactone, for which n has a value of 4 and all of the $R^2$ substituents are hydrogen, is preferred. The reaction with lactone is initiated by low molecular mass polyols such as ethylene glycol, 1,3-propanediol, 1,4-butanediol, and dimethylolcyclohexane. It is, however, also possible to react other reaction components, such as ethylenediamine, alkyldialkanolamines or else urea, with caprolactone. Also suitable as diols of relatively high molecular mass are polylactam diols, which are prepared by reacting, for example, ε-caprolactam with low molecular mass diols.

Acrylate Binder (AC)

The waterless high-solids basecoat material of the invention contains 10% to 30% by weight, based on the total weight of the basecoat material, of at least one acrylate binder (AC).

Preferably the basecoat material of the invention contains 11% to 25% by weight, more preferably 12% to 20% by weight, of at least one acrylate binder (AC), based in each case on the total weight of the basecoat material.

Suitable acrylate binders (AC) are, for example, random, alternating and/or block, linear and/or branched and/or comb (co)polymers of acrylic acid and/or methacrylic acid and also, where appropriate, additional ethylenically unsaturated monomers, and also compounds obtained from these (co)polymers by means of polymer-analogous reactions.

By acrylate binders (AC) are meant, therefore, (meth)acrylate (co)polymers and derivatives obtained from (meth)acrylate (co)polymers by polymer-analogous reactions. The (meth)acrylate notation encompasses acrylates, methacrylates, and mixtures thereof. The (co)polymer notation encompasses homopolymers and copolymers. The term (meth)acrylate (co)polymers therefore encompasses homopolymers and copolymers of acrylic acid and acrylic acid derivatives, methacrylic acid and methacrylic acid derivatives, and also, where appropriate, additional ethylenically unsaturated comonomers other than (meth)acrylic acid and derivatives thereof.

Polymer-analogous reactions are reactions on macromolecules that are carried out while retaining the polymer character of the substrates. Their effect, therefore, is to convert one polymer into another. Polymer-analogous reactions are generally carried out via functional groups of the macromolecules. Regarding the term "polymer-analogous reaction", further details are given in Römpp Chemie Lexikon, 9$^{th}$ edition 1995, Volume PL-S, pages 3542-3543, entry heading "Polymeranaloge Reaktionen" [Polymer-analogous reactions].

Suitable acrylate binders (AC) are the acrylate binders typically employed in basecoat materials in the automobile industry sector, with the selection of the nature and amount of the synthesis components employed in preparing these binders being used, in a manner familiar to the skilled worker, to control the properties and hence the suitability of the binders for the basecoat material of the invention.

It is preferred to employ acrylate binders (AC) containing thio, hydroxyl, N-methylolamino, N-alkoxymethylamino, imino, carbamate, allophanate and/or carboxyl groups, preferably hydroxyl or carboxyl groups, on the one hand, and to employ crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, beta-hydroxyalkylamide, blocked and nonblocked isocyanate, urethane or alkoxymethylamino groups, on the other.

In the case of self-crosslinking acrylate binders (AC) the binders contain more particularly methylol, methylol ether and/or N-alkoxymethylamino groups.

Complementary reactive functional groups which are especially suitable for use in the coating materials of the invention are hydroxyl groups on the one hand and blocked and nonblocked isocyanate, urethane or alkoxymethylamino groups on the other.

The functionality of the acrylate binders (AC) with respect to the above-described reactive functional groups may vary very widely and is guided in particular by the target crosslinking density and/or by the functionality of the crosslinking agents (V) employed in each case. In the case of hydroxyl-containing acrylate binders (AC), for example, the OH number is preferably 15 to 300, more preferably 20 to 250, with particular preference 25 to 200, very preferably 30 to 150, and in particular 35 to 120 mg KOH/g in accordance with DIN 53240.

The above-described complementary functional groups can be incorporated into the acrylate binders (AC) in accordance with the customary and known methods of polymer chemistry. This can be done, for example, by the incorporation of monomers which carry corresponding reactive functional groups, and/or by means of polymer-analogous reactions.

Suitable acrylate binders (AC) generally have a weight-average molecular weight of 400 to 5000 g/mol. The molecular weight is determined by means of GPC analysis with THF (+0.1% of acetic acid) as eluent (1 ml/min) on a styrene-divinylbenzene column combination. Calibration is carried out with polystyrene standards.

Suitable acrylate binders (AC) may be prepared by methods known to the skilled worker, using corresponding olefinically unsaturated monomers containing reactive functional groups, where appropriate in combination with monomers without reactive functional groups.

Examples of suitable olefinically unsaturated monomers containing reactive functional groups are as follows:
a) monomers which carry at least one hydroxyl, amino, alkoxymethylamino, carbamate, allophanate or imino group per molecule, such as
  hydroxyalkyl esters of acrylic acid, methacrylic acid or another alpha,beta-olefinically unsaturated carboxylic acid that derive from an alkylene glycol which is esterified with the acid, or that are obtainable by reacting the alpha, beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as ϵ-caprolactone, for example, and these hydroxyalkyl or cycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 C atoms per molecule, more particularly of a Versatic® acid, or, instead of the reaction product, an equivalent amount of acrylic and/or methacrylic acid, which is then reacted, during or after the polymerization reaction, with the glycidyl ester of an alpha-branched monocarboxylic acid having 5 to 18 C atoms per molecule, more particularly a Versatic® acid;

aminoethyl acrylate, aminoethyl methacrylate, allylamine or N-methylimino-ethyl acrylate;

N,N-di(methoxymethyl)aminoethyl acrylate or methacrylate or N,N-di(butoxymethyl)aminopropyl acrylate or methacrylate;

(meth)acrylamides, such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;

acryloyloxy- or methacryloyloxyethyl, -propyl or -butyl carbamate or allophanate; further examples of suitable monomers containing carbamate groups are described in patent publications U.S. Pat. No. 3,479,328, U.S. Pat. No. 3,674,838, U.S. Pat. No. 4,126,747, U.S. Pat. No. 4,279,833 or U.S. Pat. No. 4,340,497.

b) Monomers which carry at least one acid group per molecule, such as
  acrylic acid, beta-carboxyethyl acrylate, methacrylic acid, ethacrylic acid, crotonic acid, maleic acid, fumaric acid or itaconic acid;
  olefinically unsaturated sulfonic or phosphonic acids or their partial esters;
  mono(meth)acryloyloxyethyl maleate, succinate or phthalate; or
  vinylbenzoic acid (all isomers), alpha-methylvinylbenzoic acid (all isomers) or vinylbenzenesulfonic acid (all isomers).

c) Monomers containing epoxide groups, such as the glycidyl ester of acrylic acid, methacrylic acid, ethacrylic acid, crotonic acid, maleic acid, fumaric acid or itaconic acid, or allyl glycidyl ether.

Monomers of the above-described kind that are of higher functionality are generally used in minor amounts. For the purposes of the present invention, minor amounts of monomers of relatively high functionality mean those amounts which do not lead to crosslinking or gelling of the (meth) acrylate (co)polymers.

Examples of suitable olefinically unsaturated monomers without reactive functional groups include alkyl esters of acrylic acid, methacrylic acid or another alpha,beta-olefinically unsaturated carboxylic acid, vinylaromatic compounds, and mixtures of these monomers.

Crosslinking Agent (V)

The basecoat material of the invention contains 9.5% to 30% by weight, based on the total weight of the basecoat material, of at least one crosslinking agent (V) which is selected from the group consisting of free isocyanates, blocked isocyanates, and amino resins.

Preferably the basecoat material of the invention contains 10% to 25% by weight, more preferably 10.5% to 20% by weight, based in each case on the total weight of the basecoat material, of at least one crosslinking agent (V) which is selected from the group consisting of free isocyanates, blocked isocyanates, and amino resins.

Suitable free and/or blocked isocyanates are the free and blocked isocyanates that are typically used in the field of the paint industry, such as, for example, hexamethylene diisocyanate (HDI), isophorone diisocyanate (IPDI), tolylene diisocyanate (TDI), their dimers and trimers, and also derivatives and blocked versions.

Blocked isocyanates may be obtained from isocyanates by reaction of a blocking agent. Suitable blocking agents for isocyanates include all commonly used blocking agents, such as the corresponding alcohols, amines, ketones, and pyrazoles, etc., preferably blocking agents with an unblocking temperature below 130° C.; and more particularly dimethylpyrazole.

Suitable amino resins are in principle the amino resins that are typically used in the field of the paint industry, it being possible to control some properties of the basecoat material via the reactivity of the amino resins. It is possible to use monomeric crosslinking resins such as hexa(methoxymethyl)melamine (HMMM) or melamines with mixed etherification, or else to use polymeric crosslinking resins. Preference is given to using amino resins that are etherified with methanol and/or butanol, examples being the products obtainable commercially under the names Cymel®, Resimene®, Maprenal®, and Luwipal®, especially Resimene® 747 and Resimene® 755.

Catalyst (K)

The basecoat material of the invention contains 1% to 3% by weight, based on the total weight of the basecoat material, of at least one sulfonic acid catalyst.

Preferably the basecoat material of the invention contains 1.2% to 2.8% by weight, more preferably 1.4% to 2.6% by weight, based in each case on the total weight of the basecoat material, of at least one sulfonic acid catalyst.

Suitable sulfonic acid catalysts are, for example, dodecylbenzenesulfonic acid (DDBSA), dinonylnaphthalenedisulfonic acid (DNNSA), para-toluenesulfonic acid (p-TSA), and also blocked sulfonic acid catalysts such as blocked DDBSA, blocked DNNSA or blocked p-TSA.

Preferably the basecoat material of the invention comprises a blocked sulfonic acid catalyst.

As blocked sulfonic acid catalysts it is preferred to use amine-blocked or covalently blocked sulfonic acid catalysts, in order to ensure the stability and durability of the coating systems. The sulfonic acid catalysts are therefore preferably blocked using tertiary alkylated amines or heterocyclic amines, such as 2-amino-2-methylpropanol, diisopropanolamine, dimethyloxazolidine or trimethylamine, for example. Covalently bonding blocking agents used are, for example, epoxy compounds or epoxy isocyanate compounds. Blocked sulfonic acid catalysts of this kind are described in detail in the patent publication U.S. Pat. No. 5,102,961.

The choice of sulfonic acid catalyst (K) may also be made dependent on the crosslinker (V) employed. As crosslinkers (V) the basecoat materials of the invention may comprise, for example, monomeric crosslinking resins such as hexa(methoxymethyl)melamine (HMMM) or melamines with mixed etherification, or else polymeric crosslinking resins. The crosslinkers (V) that are used may contain different functional groups. The crosslinking reaction with hydroxyl- or carbamate-functional groups takes place optimally with strong acid catalysts such as dodecylbenzenesulfonic acid (DDBSA), dinonylnaphthalenedisulfonic acid (DNNSA) or para-toluenesulfonic acid (p-TSA). More reactive polymeric crosslinking resins with a high NH group content react better with blocked catalysts.

Pigments (P)

The basecoat material of the invention contains 1% to 35% by weight, based on the total weight of the basecoat material, of at least one pigment (P).

Pigments are colorants in powder or flake or platelet form which are insoluble, in contrast to dyes, in the surrounding medium (cf. Römpp Lacke and Druckfarben, page 451, entry heading "Pigmente" [Pigments])

The pigment is preferably selected from the group consisting of organic and inorganic, color-imparting, effect-imparting, color- and effect-imparting, magnetically shielding, electrically conductive, corrosion-inhibiting, fluorescent, and phosphorescent pigments. Preference is given to using the color- and/or effect-imparting pigments (color and/or effect pigments).

With particular preference the basecoat material comprises at least one effect pigment, more particularly at least one metal flake pigment. Together with the effect pigment or pigments, the basecoat material may further comprise at least one, or two or more, color pigment(s).

Examples of suitable effect pigments, which may also impart color, are metal flake pigments, such as commercial aluminum bronzes and commercial stainless steel bronzes, and also nonmetallic effect pigments, such as, for example, pearlescent pigments and interference pigments, platelet-shaped effect pigments based on iron oxide, or liquid-crystalline effect pigments. For further details refer to Römpp Lexikon Lacke and Druckfarben, page 176, entry heading "Effektpigmente" [Effect pigments] and pages 380 and 381, entry headings "Metalloxid-Glimmer-Pigmente" [Metal oxide-mica pigments] to "Metallpigmente" [Metallic pigments].

Commercial aluminum bronzes are used in particular. Use is made both of untreated types, which are available commercially, for example, under the name Stapa® Metallux from Eckart, and of treated types, especially silanized types, which are described, for example, in WO 01/81483 and are available commercially, for example, under the name Hydrolan® from Eckart.

The metal flake pigment preferably has a thickness of 200 to 2000 nm and more particularly 500 to 1500 nm.

The metal flake pigment preferably has an average particle size of 10 to 50 and more particularly of 13 to 25 μm (ISO 13320-1 by Cilas (instrument 1064)).

Suitable organic and/or inorganic color pigments are the pigments that are typically employed in the paint industry.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke and Druckfarben, Georg Thieme Verlag, 1998, pages 180 and 181, entry headings "Eisenblau-Pigmente" [Iron blue pigments] to "Eisenoxidschwarz" [Black iron oxide], pages 451 to 453, entry headings "Pigmente" [Pigments] to "Pigmentvolumenkonzentration" [Pigment volume concentration], page 563, entry heading "Thioindigo-Pigmente" [Thioindigo pigments], page 567, entry heading "Titandioxid-Pigmente" [Titanium dioxide pigments], pages 400 and 467, entry heading "Natürlich vorkommende Pigmente" [Naturally occurring pigments], page 459, entry heading "Polycyclische Pigmente" [Polycyclic pigments], page 52, entry headings "Azomethinpigmente" [Azomethine pigments], and "Azopigmente" [Azo pigments], and page 379, entry heading "Metallkomplex-Pigmente" [Metal complex pigments].

The amount of the pigments may vary very widely and is guided primarily by the depth of the color and/or the intensity of the effect that are to be established, and also by the dispersibility of the pigments in basecoat materials. In the case of solid-color basecoat materials, based in each case on the total weight of the basecoat material, the pigment content is preferably 3% to 35% by weight. By solid-color basecoat materials are meant basecoat materials which contain no metallic or effect pigments. In the case of metallic coating materials, based in each case on the total weight of the basecoat material, the pigment content is preferably 1% to 35%, more preferably 1% to 30% by weight.

Organic Solvents (L)

The basecoat material of the invention contains 30% to 65% by weight, based on the total weight of the basecoat material, of at least one organic solvent (L).

Preferably the basecoat material of the invention contains 35% to 63% by weight, more preferably 40% to 60% by weight, based in each case on the total weight of the basecoat material, of at least one organic solvent (L).

Suitable organic solvents (L) are all solvents which are typically used in the paint industry, examples being alcohols, glycol ethers, esters, ether esters, and ketones, aliphatic and/or aromatic hydrocarbons, such as, for example, acetone, methyl isobutyl ketone, methyl ethyl ketone, butyl acetate, 3-butoxy-2-propanol, ethyl ethoxypropionate, butylglycol, butylglycol acetate, butanol, dipropylene glycol methyl ether, butyl glycolate, xylene, toluene, Shellsol T, Pine Oel 90/95, Solventnaphtha®, Shellsol® A, Solvesso, benzine 135/180, and the like.

Through the amount of organic solvent (L) the viscosity of the basecoat material can be influenced. The amount of organic solvent (L) is preferably chosen such that the basecoat material of the invention at 23° C. has a viscosity of 16 s to 35 s, preferably 18 to 25 s, flow time in the Ford 3 cup. In the present specification, a viscosity of this kind of 16 s to 35 s, preferably 18 to 25 s, as the flow time in the Ford 3 cup at 23° C. is referred to generally as "spray viscosity".

Through the amount of organic solvent (L) the solids content of the basecoat material as well is influenced. The amount of organic solvent (L) in the basecoat material of the invention is thus always chosen such that the basecoat material has a solids content of at least 35% by weight. The solids content of the basecoat material is determined in accordance with DIN ISO 3251 with an initial mass of 1.0 g over a test duration of 60 minutes at a temperature of 125° C.

The basecoat materials of the invention are waterless. A waterless basecoat material is a basecoat material which is fully or substantially free of water.

Auxiliaries and Additives (Z)

The basecoat material of the invention contains 0.5% to 47% by weight, based on the total weight of the basecoat material, of at least one auxiliary or additive (Z).

Preferably the basecoat material of the invention contains 1% to 45% by weight, more preferably 1.5% to 40% by weight, based in each case on the total weight of the basecoat material, of at least one auxiliary or additive (Z).

Suitable auxiliaries or additives (Z) are the known auxiliaries and additives that are typically used in the paint industry. Examples of suitable auxiliaries and additives are organic and inorganic fillers, such as talc, and/or dyes (organic substances that are black or chromatic and are soluble in the surrounding medium (cf. Römpp Lacke and Druckfarben, page 221, entry heading "Farbmittel" [Colorants])), and also further customary auxiliaries and additives, such as, for example, antioxidants, deaerating agents, wetting agents, dispersants, emulsifiers, rheological assistants such as flow control agents, thickeners, polymer microparticles, antisag agents, and thixotropic agents, waxes and waxlike compounds, slip additives, reactive diluents, freeflow aids, siccatives, biocides, additives for improving the substrate wetting, additives for improving the surface smoothness, matting agents, free-radical scavengers, light stabilizers, preferably UV absorbers with an absorption maximum below 370 nm and/or HALS, corrosion inhibitors, flame retardants or polymerization inhibitors, as described in detail in the book "Lackadditive" [Additives for Coatings] by Johan Bieleman, Wiley-VCH, Weinheim, N.Y., 1998. Preferred auxiliaries and additives are rheological assistants, deaerating agents, wetting agents, dispersants, waxes and waxlike compounds, UV absorbers, and free-radical scavengers. Particularly preferred auxiliaries and additives are UV absorbers, polymer microparticles, wetting agents, and waxes and waxlike compounds.

Polymer Microparticles (M)

Suitable polymer microparticles (M) are described in, for example, EP-A-480 959, page 3 line 36 to page 4 line 35, WO 96/24619, WO 99/42529, EP-B-1 173 491, EP-B-1 185 568, WO 03/089487, WO 03/089477, WO 01/72909 and WO 99/42531.

Suitable polymer microparticles typically have a weight-average molecular weight of 2000 to 100 000. The molecular weight is determined by means of GPC analysis with THF (+0.1% of acetic acid) as eluent (1 ml/min) on a styrene-divinylbenzene column combination. Calibration is carried out with polystyrene standards.

Suitable polymer microparticles also typically have an average particle size of 0.01 to 10 μm, in particular of 0.01 to 5 μm, and very preferably of 0.02 to 2 μm, in accordance with ISO 13320-1.

Polymer microparticles used with particular preference contain reactive functional groups which are able to react with the functional groups of the crosslinking agent. In particular the polymer microparticles contain hydroxyl groups. In this case the polymer microparticles preferably have a hydroxyl number of 5 to 150 mg KOH/g in accordance with DIN 53240. Hydroxyl-containing polymer microparticles are described in WO 01/72909, for example.

Crosslinked polymer microparticles are obtainable by, for example, subjecting a mixture of:
(a) an ethylenically unsaturated monomer which contains one ethylenically unsaturated group per molecule, or a mixture of such monomers, and
(b) an ethylenically unsaturated monomer which contains at least two ethylenically unsaturated groups per molecule, or a mixture of such monomers,
to polymerization in an aqueous phase in the presence, if desired, of emulsifiers or in the presence, if desired, of a carrier resin, and then transferring the aqueous polymer microparticle dispersion obtained in this way into an organic solvent or a mixture of organic solvents.

Preference is given to polymer microparticles which have been prepared using components containing ionic and/or polar groups, preferably hydroxyl groups and/or carboxyl groups. The components (a) and (b) ought in general to contain between 1% and 20%, preferably between 3% and 15%, by weight of ionic and/or polar groups.

In order to obtain sufficiently crosslinked polymer microparticles it is generally sufficient to use 0.25 to 1.2 mol, preferably 0.3 to 1 mol, of component (b) per mole of component (a).

Alternatively the polymer microparticles (M) used in the basecoat materials may be prepared directly in organic phase.

Polymer microparticles used with preference are obtainable, for example, by subjecting a mixture of:
(c) an ethylenically unsaturated monomer (M1) which contains at least one reactive group (G1) per molecule, or a mixture of such monomers (M1), and
(d) if desired, an ethylenically unsaturated monomer (M2) which contains at least one non-(G1) reactive group (G2) per molecule, or a mixture of such monomers (M2), and
(e) if desired, a further ethylenically unsaturated monomer (M3) or a mixture of such monomers (M3)
to polymerization in an organic solvent in the presence, if desired, of a carrier resin.

Examples of suitable monomers (M1) are monomers which contain hydroxyl groups, carbamate groups, amino groups, alkoxymethylamino groups, allophanate groups or imino groups, especially hydroxyl groups.

The monomers (M1) with the reactive groups (G1) here may also be prepared by reacting two compounds of which one compound (a) contains a reactive group (a) and at least one ethylenically unsaturated double bond, and the other compound contains an ethylenically unsaturated double bond.

Examples of suitable monomers (M2) are monomers which contain carboxyl groups.

Suitable monomers (M3) are the so-called neutral monomers that are typically employed, i.e., ethylenically unsaturated monomers which contain no reactive groups.

Waxes and Waxlike Compounds (W)

The basecoat material of the invention may further comprise one or more waxes and/or one or more waxlike compounds. "(W)" embraces both waxes and waxlike compounds.

Suitable waxes and waxlike compounds are described in WO 2008/058590, for example.

In connection with the present invention, the terms "wax" and "waxlike compound" refer to all natural and synthetically obtained substances which have the following properties:
1. Kneadable or solid at 20° C.
2. Coarsely to finely crystalline, translucent to opaque.
3. Melting at above 40° C. without decomposition.
4. Of low viscosity even a little above the melting point.
5. Highly temperature-dependent in consistency and solubility.
6. Can be polished under gentle pressure.

If a substance fails to exhibit more than one of these properties, it is no longer a "wax" for the purposes of this invention (cf. Ullmanns Enzyklopädie der technischen Chemie; 4$^{th}$, revised and expanded edition; Verlag Chemie; Weinheim; Deerfield Beach, Fla.; Basel, 1983, page 3).

The waxes or waxlike compounds (W) may be modified and/or unmodified. All waxes that are customary and known per se are suitable, though it is preferred to use synthetic waxes.

Examples of natural waxes are plant waxes, such as carnauba wax, candelilla wax, esparto wax, guaruma wax, japan wax, cork wax, montan wax, ouricury wax, rice germ oil wax, sugarcane wax, animal waxes, such as beeswax, uropygial gland oil, wool wax, shellac wax, spermaceti, and mineral waxes, such as ceresin and ozokerite.

Examples of chemically modified waxes are hydrogenated jojoba waxes, montan ester waxes, and Sasol waxes.

Also suitable, for example, are modified and unmodified polyolefin waxes, such as polyethylene and polypropylene waxes, polyethylene glycol waxes, and polyamide waxes. Also suitable, furthermore, are polyacrylate polymers and polyacrylate copolymers which like wax exhibit a pronounced temperature dependence of the solubility in organic solvents.

The waxes or polyacrylate polymers and polyacrylate copolymers commonly have a weight-average molecular weight between 300 and 20 000 g/mol, preferably between 1000 and 10 000 g/mol, and preferably have Ubbelohde drop points of between 70 and 180° C. The drop point is a characteristic of lubricants. It identifies the temperature at which a lubricant grease under standardized test conditions forms an elongating droplet. It is regulated under DIN ISO 2176.

The polyethylene waxes and polypropylene waxes are either homopolymers or copolymers having typically 0.5% to 40% by weight of comonomer units, which derive from saturated or unsaturated monocarboxylic acids or their amides or esters. Examples of such comonomer units include the radicals of acrylic acid, methacrylic acid, maleic acid, fumaric acid, acrylamide, stearic acid or stearamide, or vinyl acetate. The polyolefin waxes are available commercially under diverse designations.

Suitable polyamide waxes include all of the polyamide waxes that are typically employed in coating compositions, examples being polyamide waxes containing fatty acid, which are available commercially, for example, under the name Disparlon®.

Also suitable are waxlike polysiloxanes, such as polydimethylsiloxanes, polydiphenylsiloxanes, or modified silicones, e.g., polyester-, polyether-, and acrylate-modified silicones, for example.

The compound (W) is used preferably in an amount of 0.2% to 2% by weight, more preferably of 0.5% to 1.5% by weight, based in each case on the total weight of the basecoat material.

Inorganic Particles (N)

The basecoat material of the invention may comprise as additive one or more inorganic particles (N) with a particle size of 1 to 800 nm, preferably of 3 to 250 nm, more preferably of 4 to 100 nm. This particle size refers to the size of the dispersed particles (N) prior to incorporation into the basecoat material. Particle size may be determined by means of electron microscopy, for example.

Suitable inorganic particles (N) are described in WO 2008/058590, for example.

The inorganic particles (N) preferably have a primary particle size of 3 to 200 nm, more particularly of 3 to 30 nm. In contrast to the above-described pigments, the inorganic particles (N) used in the basecoat materials are typically substantially colorless, in particular so as not to affect the hue of the basecoat material.

The inorganic particles (N) may be present in the form of separate particles or in the form of agglomerates, though it is preferred to use separate particles. In particular the inorganic particles (N) ought especially to be easily and stably incorporable into the basecoat material, in order to ensure the desired utility of the basecoat material. The inorganic particles (N) ought therefore either to remain stably dispersed for a long time (in the automotive finishing sector, for example, over a period of up to 12 months on storage at temperatures of up to 30° C.) or else to be readily dispersible with typical means of paint mixing, such as using stirrers, for example.

It is preferred to use inorganic particles (N) which have a density of 0.8 to 4.5 g/cm$^3$ in accordance with DIN 53217.

The inorganic particles (N) are typically selected from the group consisting of the compounds of the main-group and transition-group metals, preferably of the metals from main groups three to five, transition groups three to six and also one and two of the periodic table of the elements, and also the lanthanides, more particularly compounds of boron, aluminum, gallium, silicon, barium, germanium, tin, arsenic, antimony, silver, zinc, titanium, zirconium, hafnium, vanadium, niobium, tantalum, molybdenum, tungsten, and cerium, especially aluminum, silicon, barium, silver, cerium, titanium, and zirconium.

The compounds of the metals are preferably the oxides, oxide hydrates, sulfates or phosphates. Suitable inorganic particles (N) are preferably selected from the group consisting of hydrophilic and hydrophobic, especially hydrophilic, particles based on silicon dioxide, aluminum oxide, zinc oxide, zirconium oxide, barium sulfate, and the polyacids and heteropolyacids of transition metals, preferably of molybdenum and tungsten. Particular preference is given to using particles based on silicon dioxide and/or aluminum oxide, more particularly fumed or colloidal silicon dioxide.

Very particular preference is given to using hydrophilic fumed silicon dioxides whose agglomerates and aggregates have a catenary structure, preparable by the flame hydrolysis of silicon tetrachloride in an oxyhydrogen flame. These silicas are sold by the company Degussa under the brand name Aerosil®, for example.

Also useful as inorganic particles (N), however, are sols, especially organosols. Sols of this kind are described for example in U.S. Pat. No. 4,522,958, column 7 line 26 to column 11 line 14. Particular mention is made here of silica-based sols in which the inorganic particles are formed in situ and are modified, during and/or after their formation, with a stabilizer (S) (and are known as stabilized inorganic particles). These particles may be prepared by means of a multiplicity of different techniques known to the skilled worker.

It is advantageous to incorporate the inorganic particles (N) in the form of pastes. Further advantages result if the paste resins or grinding resins used are the binders already described that are present in the basecoat material. As paste resins or grinding resins for the particles (N) use is made in particular of binders which are also used for dispersing the pigments.

The particles (N) are used preferably in an amount of 0.2% to 2% by weight, more preferably of 0.5% to 1.5% by weight, based in each case on the total weight of the basecoat material.

Stabilizer (S)

The inorganic particles (N) are at least partly modified with a stabilizer (S) which comprises at least one group (S1) which is able to interact with the surface of the inorganic particles (N), and one or more hydrophobic substructures.

Suitable stabilizers (S) are described in WO 2008/058590, for example.

The stabilizer (S) may interact with the inorganic particles (N) via the groups (S1). In that case it is possible for the stabilizer to interact with the inorganic particles only by way of physical forces, although it is also possible for there to be, at least in part, a chemical reaction between the groups (S1) and the functional groups that are customarily located on the surface of the inorganic particles. Thus, in particular, the hydrophilic inorganic particles have hydroxyl groups on their surface (in the form of SiOH groups in the case of the $SiO_2$ types, for example), which are able to interact not only chemically but also physically, such as in the form of hydrogen bonds, for example, with the groups (S1).

The groups (S1) of the stabilizer are preferably selected from the group of hydroxyl, carboxyl, ether, phosphate, phosphonate, bisphosphonate, sulfate or sulfonate groups or nitrogen-containing hydrophilic groups or mixtures thereof. Particularly preferred stabilizers (S) are those containing not only hydroxyl groups but also carboxyl groups. Particular preference is also given to stabilizers (S) which contain not only hydroxyl groups but also carboxyl groups and ether groups. Use is made in particular of stabilizers (S) which have a hydroxyl number of 10 to 150 mg KOH/g in accordance with DIN 53240 and an acid number of 2 to 50 mg KOH/g in accordance with DIN EN ISO 3682, based in each case on the solids of the stabilizer (S).

The stabilizer (S) may further comprise one or more hydrophobic substructures. These hydrophobic radicals can interact with the organic constituents of the basecoat material, in particular with the solvent, the binders, and the wax and/or waxlike compound (W).

The stabilizer (S) may therefore contain, in particular, one or more organic radicals (R1) which comprise the hydrophobic substructures. Furthermore, the organic radical or radicals (R1) may where appropriate also contain hydrophilic substructures and/or the groups (S1) may be attached at least partly, or completely, to these organic radicals (R1).

It is preferred for the hydrophobic substructures of the stabilizer (S) to be selected at least in part from the group of alkyl or alkenyl groups, especially alkyl or alkenyl groups having 5 to 50 C atoms.

Particularly preferred hydrophobic substructures used are the radicals of saturated and/or unsaturated fatty acids, especially of saturated and/or unsaturated fatty acids having 5 to 30 carbon atoms in the molecule, such as, for example, radicals of valeric acid, caproic acid, enanthic acid, caprylic acid, pelargonic acid, capric acid, undecylic acid, lauric acid, myristic acid, palmitic acid, stearic acid, oleic acid, elaidic acid, arachidic acid, behenic acid, lignoceric acid, cerotinic acid, melissic acid, linoleic acid, ricinene acid, ricinoleic acid, linolenic acid, arachidonic acid, clupanodonic acid, alpha-eleostearic acid, alpha-licanic acid, alpha-parinaric acid, ricinoleic acid, and isanolic acid, and mixtures of these fatty acids, and/or the corresponding hydroxy acids of the stated fatty acids, or mixtures thereof. Very particular preference is given to using stabilizers which comprise radicals of hydroxyvaleric acid, hydroxycaproic acid, hydroxystearic acid, hydroxylauric acid, ricinoleic acid or mixtures thereof.

Also suitable, furthermore, are the corresponding radicals of dimer and trimer fatty acids and also their mixtures, and the radicals of the corresponding mixtures of the dimer and/or trimer fatty acids with the stated fatty acids.

It is very particularly preferred to make use as stabilizer (S) of esters of the stated (hydroxy) fatty acids, (hydroxy) dimer fatty acids and/or (hydroxy) trimer fatty acids, particularly esters with polyalkylene glycols, more preferably esters with polyalkylene glycols having 6 to 20 C atoms, such as diethylene glycol, triethylene glycol, tetraethylene glycol, dipropylene glycol, tripropylene glycol, and mixtures thereof. Here, mention is made in particular of esters of hydroxyvaleric acid, hydroxycaproic acid, and hydroxystearic acid with triethylene glycol, tetraethylene glycol, and mixtures of these hydroxyl compounds, these esters, and mixtures of the esters with the acids.

Also suitable as stabilizer (S), for example, are the corresponding commercial compounds, provided they have the requisite structure. Suitability is therefore possessed, for example, by those in commerce under the names Solsperse® from Avecia GmbH, especially Solsperse® 39000, Dispers® from Th. Goldschmidt, especially Dispers® 652, and corresponding additives from Degussa.

The stabilizer (S) is used typically in an amount of 3% to 40%, in particular of 5% to 20%, very preferably of 8% to 12%, by weight, based in each case on the weight of the inorganic particles (N) employed.

One of the assurances provided by the modification of the inorganic particles (N) with the stabilizer (S) is that even on storage at 40° C. for 28 days there will be no significant deterioration in the properties either of the basecoat materials or of the coatings produced from these stored basecoat materials; in particular, there will be no deterioration in the rheological properties of the basecoat materials, and no impairment of the optical properties of the resultant coatings.

Advantageous basecoat materials are obtained in particular when the particles (N) and the compound or compounds (W) are used in amounts such that the total amount of inorganic particles (N) plus wax and/or waxlike compound (W) is from 0.4% to 4% by weight, more preferably from 1% to 3% by weight, based in each case on the total weight of the basecoat material.

Advantageously the total amount of inorganic particles (N) plus wax and/or waxlike compound (W) is tailored to the amount of color pigments minus the amount of metallic pigments. The smaller the amount of color pigments in the basecoat material, the higher the total amount of inorganic particles (N) plus wax and/or waxlike compound (W), since, generally speaking, the flop will become more important when the amount of color pigments is small. In the case of coating compositions which contain no metallic or effect pigments, and are known as solid-color basecoat materials, use is likewise made of the combination of inorganic particles (N) plus wax and/or waxlike compound (W), which in this case has more particularly a stabilizing effect; in this case, however, smaller overall amounts of inorganic particles (N) plus wax and/or waxlike compound (W) are generally sufficient.

Preparation and Use of the Inventive Basecoat Material

The invention further provides a process for preparing a waterless high-solids basecoat material of the invention. The basecoat material of the invention can be prepared by mixing the constituents with one another and homogenizing the mixture.

The invention further provides for the use of a waterless high-solids basecoat material of the invention to produce a basecoat, and also the basecoat thus obtained.

The invention further provides for the use of a waterless high-solids basecoat material of the invention to produce a multicoat paint system.

Multicoat Paint System and Process for Producing it

The invention further provides a multicoat paint system which comprises at least one basecoat of the basecoat material of the invention and at least one clearcoat, and also a process for producing the multicoat paint system of the invention.

A multicoat paint system is a paint system which comprises at least one basecoat and at least one clearcoat.

A basecoat is a coating which has been obtained from a basecoat material, i.e., from a pigmented coating composition.

A clearcoat is a coating which has been obtained from a transparent coating composition.

Suitable transparent coating compositions for producing the clearcoat of the multicoat paint system of the invention are all those which are typically used, such as, for example, commonly used aqueous or solventborne transparent coating compositions, which may be formulated either as one-component or as two-component or multicomponent coating compositions. Also suitable, furthermore, are powder slurry clearcoat materials. The transparent coating compositions (clearcoat materials) preferably have a solids fraction of at least 40% by weight. The transparent coating compositions employed may be curable thermally and/or by means of radiation, more particularly by means of UV radiation.

The transparent coating compositions typically comprise at least one binder with functional groups and also at least one crosslinker with a functionality complementary to the functional groups of the binder. Examples of such complementary functionalities are in particular the following pairings (a/b) that are in each case complementary to one another: (carboxyl/epoxy), (amine or thiol or hydroxyl/blocked or free isocyanate or alkoxylated amino groups or transesterifiable groups), ((meth)acryloyl/CH-acidic or amine or hydroxyl or thiol), (carbamate/alkoxylated amino groups), and ((meth)acryloyl/(meth)acryloyl).

Use is made in particular of transparent coating compositions based on polyurethane resins and/or polyacrylate resins and/or polyester resins, preferably with hydroxyl, amino, carbamate, carboxyl, (meth)acryloyl and/or thiol groups, in combination with the corresponding crosslinkers, more particularly in combination with isocyanates, amino resins, anhydrides, and the like.

Besides the binder and crosslinker, the transparent coating compositions comprise customary auxiliaries and additives, such as, for example, catalysts for crosslinking, defoamers, adhesion promoters, additives for improving substrate wetting, additives for improving surface smoothness, matting agents, light stabilizers, preferably UV absorbers with an absorption maximum below 370 nm and/or HALS, corrosion inhibitors, biocides, flame retardants or polymerization inhibitors, as described in detail in the book "Lackadditive" [Additives for Coatings] by Johan Bieleman, Wiley-VCH, Weinheim, N.Y., 1998.

Suitable transparent coating compositions are described in WO 03/050194 A1, in US 2008/076868 A1, and in WO 06/063304 A1, for example.

The basecoat of the invention comprises at least one basecoat obtained from a basecoat material of the invention.

The multicoat paint system of the invention comprises at least one basecoat of the basecoat material of the invention and at least one clearcoat. The multicoat paint system of the invention may comprise one or more basecoats and one or more clearcoats. Preferably the multicoat paint system of the invention comprises precisely one basecoat and precisely one clearcoat.

The paint system of the invention, more particularly a multicoat paint system, may be applied to any desired substrates. The substrates may be constructed of any of a very wide variety of materials and combinations of materials. Preferably they are composed of metals, plastics and/or glass, more preferably of metal and/or plastic.

The substrates are typically provided with a primer and, if desired, with a surfacer, which are applied by the customary techniques, such as electrodeposition coating, dipping, knifecoating, spraying, rolling or the like. The primer is preferably at least partly or fully cured before the pigmented coating composition is applied. The primer and/or the surfacer are/is typically cured by heating to a temperature between 80 and 170° C. for a time of 3 to 30 minutes.

In the process of the invention for producing a basecoat, at least one basecoat material of the invention is applied to an optionally precoated substrate.

In the process of the invention for producing a multicoat paint system, in the order a. first at least one basecoat material of the invention and subsequently b. at least one clearcoat material (transparent coating composition) are applied to an optionally precoated substrate.

The optionally applied transparent coating composition (CC, clearcoat), like the pigmented coating composition (BC, basecoat), is applied by means of conventional methods of applying liquid coating compositions, such as dipping, knifecoating, spraying, rolling or the like, for example, but more particularly by means of spraying. It is preferred to employ spray application methods, such as, for example, compressed air spraying, airless spraying, high-speed rotation, electrostatic spray application (ESTA), alone or in conjunction with hot spray application such as, for example, hot air spraying. It is particularly advantageous to apply the pigmented coating composition in a first pass by ESTA and in a second pass pneumatically.

Where a transparent coating composition (CC) is applied as well, the pigmented coating (BC) is briefly flashed off or briefly dried, generally at a temperature between 30 and less than 100° C., for a time of 1 to 15 minutes. Thereafter the transparent coating composition is applied.

The applied pigmented film (BC) and the optionally applied transparent film (CC) are jointly cured thermally. Where the transparent coating composition (CC) is also curable with actinic radiation as well, there is an aftercure by exposure to actinic radiation. Curing may take place after a certain rest time. It may have a duration of 30 seconds to 2 hours, preferably 1 minute to 1 hour, and more particularly 1 to 45 minutes. The rest time is used, for example, for the flow and for the degassing of the coating films, or for the evaporation of volatile constituents. The rest time may be shortened and/or assisted by the application of elevated temperatures of up to 90° C. and/or by a reduced air humidity (<10 g water/kg air), provided this does not entail any damage or change to the coating films, such as premature complete crosslinking, for instance.

Curing takes place typically at a temperature between 90 and 160° C. for a time of 15 to 90 minutes.

For the drying or conditioning of the wet pigmented coating and, where appropriate, of the wet transparent coating it is preferred to use thermal and/or convection processes, in which case customary and known apparatus is used, such as tunnel ovens, NIR and IR heating lamps, fans, and blowing tunnels. These types of apparatus may also be combined with one another.

In the paint systems and multicoat paint systems of the invention, the basecoat generally has a dry film thickness of 3 to 40 µm, advantageously of 5 to 30 µm, more advantageously of 7 to 25 µm, preferably of 10-20 µm, more preferably of 10-16 µm, and very preferably of 11-13 µm.

In the multicoat paint systems of the invention the clearcoat generally has a dry film thickness of 10 to 120 µm, preferably of 30 to 80 µm, more particularly of 40 to 70 µm.

The invention further provides for the use of the paint systems of the invention, more particularly of the multicoat paint systems of the invention, to coat the substrates indicated above.

The paint systems of the invention, multicoat paint systems in particular, are employed more particularly in the field of automotive OEM finishing, but also in the fields of commercial vehicle finishing and automotive refinish, for the coating of vehicle bodies or of components for installation inside or outside the bodywork. They are also suitable, however, for other sectors, such as, for example, for the coating of components for boatbuilding and aircraft construction, or of components for household and electrical appliances or parts thereof.

Additionally provided by the invention are substrates coated with at least one high-solids basecoat material of the invention. These substrates of the invention are preferably metallic substrates and/or plastics substrates. Preferred substrates are those coated with a multicoat paint system of the invention. Particular preference is given to metallic and/or plastics substrates coated with a multicoat paint system of the invention.

EXAMPLES

In the examples the acid number (AN) is determined in accordance with DIN 53402 and the OH number (hydroxyl number) in accordance with DIN 53240.

The molecular weight of the polyester resins (PE) is determined by means of GPC analysis with THF (+0.1% of acetic acid) as eluent (1 ml/min) on a styrene-divinylbenzene column combination. Calibration is carried out with polystyrene standards.

1. Preparation of the Acrylate Binder (AC)

A reactor is charged with 13.2 parts by weight of Solvesso 100 and this initial charge is heated to 167° C. Added to the reactor at a pressure of 0.35 bar and over a time of 4 hours, simultaneously, are a monomer mixture consisting of 2.1 parts by weight of acrylic acid, 10.8 parts by weight of hydroxyethyl acrylate, 11.5 parts by weight of 2-ethylhexyl acrylate, 11.5 parts by weight of butyl acrylate, and 14.3 parts by weight of styrene, and an initiator mixture consisting of 0.7 part by weight of di-tert-butyl peroxide and 11.1 parts by weight of a solution of dicumyl peroxide in Solvesso 100 (50% strength). The mixture is then maintained at the above-stated temperature and pressure for one hour, after which, over a period of 1 hour, 21.5 parts by weight of ε-caprolactone are added. The mixture is cooled to 150° C. and held for 1.5 hours at a pressure of 0.35 bar. It is cooled and adjusted to a solids of 75% using Solvesso 100. The resulting acrylate resin has an acid number of 23 mg KOH/g and an OH number of 73 mg KOH/g, based in each case on the solids.

2. Preparation of the Polyester Binders (PE-1 to PE-7)

2.1. Preparation of a Polyester (PE-1) with AN>20

A mixture of 40.0 parts by weight of adipic acid, 4.0 parts by weight of ortho-phthalic acid, 43.0 parts by weight of trimethylolpropane, 10.0 parts by weight of para-tert-butylbenzoic acid, and 1.2 parts by weight of isononanoic acid is charged to a stirred tank equipped with a water separator and this initial charge is heated to 230° C. with stirring under a nitrogen atmosphere. The course of the reaction is monitored by means of a water separator and determination of the acid number. The water liberated is collected in the water separator. The reaction mixture is held at 230° C. until the acid number reaches a value of 422 mg KOH/g. After the mixture has been cooled to below 100° C., the solids is adjusted to 70.0% by addition of xylene.

The resulting polyester resin PE-1 has an acid number of 94 mg KOH/g and an OH number of 421 mg KOH/g, based in each case on the solids. The weight-average molecular weight is 2120 g/mol.

2.2. Preparation of a Polyester (PE-2) with AN>20

In a reactor a mixture of 29.1 parts by weight of dimer fatty acid, 28.5 parts by weight of 1,6-hexanediol, 8.4 parts by weight of isophthalic acid, and 1.2 parts by weight of toluene is heated slowly to 154° C. under a nitrogen atmosphere. This mixture is then heated to 193° C. over the course of 40 minutes. The course of the reaction is monitored by means of a water separator. When an acid number of 10 mg KOH/g is reached the reaction mixture is cooled to 149° C. Subsequently 11.2 parts by weight of trimellitic anhydride are slowly added using a dropping funnel.

Complete addition of the trimellitic anhydride is followed by heating to 166° C. The course of the reaction is monitored here by determination of the acid number. When an acid number of 32 mg KOH/g is reached, the reactor is cooled to 107° C. and a mixture of 10.9 parts by weight of n-butanol, 9.6 parts by weight of n-propoxypropanol, and 0.01 part by weight of dimethanolamine is slowly added using a dropping funnel. After the mixture has been cooled to 49° C., the solids is adjusted to 73.0% by addition of 1.2 parts by weight of n-butanol.

The resulting polyester resin PE-2 has an acid number of 31 mg KOH/g and an OH number of 422 mg KOH/g, based in each case on the solids. The weight-average molecular weight is 4511 g/mol.

2.3. Preparation of a Polyester (PE-3) with AN>20

A mixture of 291 parts by weight of adipic acid, 16.0 parts by weight of fumaric acid, 40.9 parts by weight of neopentylglycol, and 15.0 parts by weight of cyclohexane-dimethanol is charged to a stirred tank equipped with a water separator and this initial charge is heated to 230° C. with stirring under a nitrogen atmosphere. The water liberated is collected in the water separator. The reaction mixture is held at 230° C. until the acid number reaches a value of 22 mg KOH/g. After the mixture has been cooled to below 100° C., the solids is adjusted to 63.0% by addition of xylene.

The resulting polyester resin PE-3 has an acid number of 21 mg KOH/g and an OH number of 51 mg KOH/g, based in each case on the solids. The weight-average molecular weight is 4854 g/mol.

2.4. Preparation of a Polyester (PE-4) with AN<20

In a reactor a mixture of 12.7 parts by weight of trimethylolpropane, 6.5 parts by weight of ethylene glycol, 13.6 parts by weight of cyclohexanedimethanol, 29.1 parts by weight of hexahydrophthalic anhydride, 9.9 parts by weight of neopentylglycol, and 28.1 parts by weight of phthalic anhydride is heated slowly to 140° C. under a nitrogen atmosphere. This mixture is then heated to 220° C. over the course of 40 minutes. The course of the reaction is monitored by means of a water separator and determination of the acid number. When an acid number of 19 mg KOH/g is reached the reactor is cooled to 195° C. After further cooling to below 100° C., the solids is adjusted to 60.0% by addition of a 1:1 mixture of butyl acetate and solvent naphtha.

The resulting polyester resin PE-4 has an acid number of 18 mg KOH/g and an OH number of 80 mg KOH/g, based in each case on the solids. The weight-average molecular weight is 9500 g/mol.

2.5. Preparation of a Polyester (PE-5) with AN<20

In a reactor a mixture of 5.2 parts by weight of glycerol, 7.2 parts by weight of trimethylolpropane, 13.5 parts by weight of 1,6-hexanediol, 20.2 parts by weight of neopentylglycol, 18.7 parts by weight of adipic acid, 23.5 parts by weight of phthalic anhydride, and 11.7 parts by weight of Cardura E10 is heated slowly to 140° C. under a nitrogen atmosphere. This mixture is then heated to 220° C. over the course of 40 minutes. The course of the reaction is monitored by means of a water separator and determination of the acid number. When an acid number of 7 mg KOH/g is reached the reactor is cooled to 195° C. After further cooling to below 100° C., the solids is adjusted to 65.0% by addition of a mixture of 0.5 part by weight of cyclohexane, 42.9 parts by weight of solvent naphtha, 5.7 parts by weight of methoxypropyl acetate, and 5.7 parts by weight of ethyl ethoxypropionate.

The resulting polyester resin PE-5 has an acid number of 8 mg KOH/g and an OH number of 102 mg KOH/g, based in each case on the solids. The weight-average molecular weight is 14 500 g/mol.

2.6. Preparation of a Polyester (PE-6) with AN<20

59.3 parts by weight of 1,6-hexanediol, 3.9 parts by weight of succinic acid, and 27.6 parts by weight of hexahydrophthalic anhydride are charged to a stirred tank equipped with a water separator and this initial charge is heated with stirring under a nitrogen atmosphere until water condenses. The mixture is cooled to 80° C. and 8.2 parts by weight of dicarboxylic acid mixture are added. Subsequently the reaction mixture is heated to 230° C. and it is stirred at this temperature, with distillative removal of water, until the acid number falls below a value of 5 mg KOH/g. After the mixture has been cooled to below 100° C., the solids is adjusted to 88% by addition of butyl acetate.

The resulting polyester resin PE-6 has an acid number of 5 mg KOH/g and an OH number of 287 mg KOH/g, based in each case on the solids. The weight-average molecular weight is 1239 g/mol.

2.7. Preparation of a Polyester (PE-7) with AN<20

A mixture of 54.0 parts by weight of cyclohexanedimethanol, 10.0 parts by weight of succinic acid, 25.0 parts by weight of dicarboxylic acid mixture, and 9.5 parts by weight of n-diethylene glycol is charged to a stirred tank equipped with a water separator and this initial charge is heated to 230° C. with stirring under a nitrogen atmosphere. The water liberated is collected in the water separator. The reaction mixture is held at 230° C. until the acid number falls below a value of 5 mg KOH/g. After the mixture has been cooled to below 100° C., the solids is adjusted to 92% by addition of butyl acetate.

The resulting polyester resin PE-7 has an acid number of 3 mg KOH/g and an OH number of 244 mg KOH/g, based in each case on the solids. The weight-average molecular weight is 1570 g/mol.

3. Preparation of Polymer Microparticles (M)

The preparation of polymer microparticles starts with the preparation of a carrier resin. For this purpose a reactor is charged with 5.8 parts by weight of xylene, 5.8 parts by weight of toluene, and 0.2 part by weight of methanesulfonic acid, and this initial charge is heated to 104° C. Subsequently the reactor is supplied with 80.6 parts by weight of 12-hydroxystearic acid and the reaction mixture is boiled under reflux at 171° C. with withdrawal of the water of reaction. When an acid number of 35 mg KOH/g is reached, based on the solids content of the product (1 h/130° C.), the reaction is at an end. After cooling has taken place, the solids content is adjusted to 80%, based on the total weight of the carrier resin solution, using 8.0 parts by weight of solvent naphtha.

In a second step a reactor is charged with 43.2 parts by weight of solvent naphtha, 0.08 part by weight of N,N-dimethylcocosamine, and 1.0 part by weight of ethyl acetate and this initial charge is heated to 104° C. Added to the reactor at a pressure of 0.69 bar over the course of 2 hours are, simultaneously, a monomer mixture consisting of 27.6 parts by weight of methyl methacrylate, 3.8 parts by weight of 2-hydroxypropyl methacrylate, 0.8 part by weight of glycidyl methacrylate, 12.8 parts by weight of the above-described carrier resin solution, 1.5 parts by weight of methacrylic acid, and 1.5 parts by weight of octyl mercaptan, and an initiator mixture consisting of 2.3 parts by weight of tert-butyl peroxy-2-ethylhexanoate and 5.1 parts by weight of solvent naphtha. The mixture is subsequently held for 3 hours at the above-stated temperature and pressure, then cooled and adjusted to a solids of 41.0% using solvent naphtha.

4. Preparation of Stabilized Inorganic Particles (N)

In a receiver vessel, 10.0 parts by weight of the acrylate binder (AC) described under 1., 6.0 parts by weight of Degussa Aerosil® 380 (commercial hydrophilic fumed silica from Degussa AG with a specific surface area (BET) of 380 m$^2$/g, an average primary particle size of 7 nm, and an SiO$_2$ content of at least 99.8% by weight, based on the calcined substance), 41.7 parts by weight of solvent naphtha, 41.7 parts by weight of butyl acetate, and 0.6 part by weight of a fatty acid ester as stabilizer (S), with a nonvolatile fraction of 96.2% (in 2 hours at 130° C.), an OH number of 50 mg KOH/g, and an acid number of 17.2 mg KOH/g, based in each case on the 130° C. solids content, containing 6-hydroxycaproic acid, hydroxyvaleric acid, lauric acid, and polyethylene glycol (for example, the commercial wetting additive based on fatty acid esters, Solsperse 39000 from Th. Goldschmidt), are mixed and dispersed.

5. Preparation of a Wax Dispersion (W)

6.0 parts by weight of the polyethylene wax EVA 1 from BASF AG (commercial polyethylene wax based on an ethylene/vinyl acetate copolymer having a melting point of 87-92° C., an Ubbelohde drop point of around 95° C., and a mass-average molecular weight of around 6500 g/mol) and 40.0 parts by weight of xylene are dissolved with slow stirring at 100° C. With further stirring the solution is cooled to 70° C. and slowly 54.0 parts by weight of butyl acetate (technical grade, around 85% purity) are added, and desired precipitation of wax begins. With further stirring the dispersion is cooled further down to 35° C.

6. Preparation of a Paste of an Aluminum Effect Pigment (A)

The paste is prepared from 50.0 parts by weight of a commercial nonleafing aluminum effect pigment paste of the silver dollar type having an average particle size of 14 µm (Metallux 2192 from Eckart) and 50.0 parts by weight of the above-described acrylate binder (AC), with stirring.

7. Preparation of a CAB Solution (C)

In a receiver vessel, 76.0 parts by weight of butyl acetate are mixed with 24.0 parts by weight of CAB 551-0.2 (commercial cellulose acetobutyrate from Eastman) for 30 minutes.

8. Preparation of the Millbase ML-0 for the Inventive Metallic Basecoat Materials and Comparative Metallic Basecoat Materials For the preparation of the inventive metallic basecoat materials BC-2 to BC-4 and BC-11 to BC-13 and BC-18 to BC-20, and of the noninventive metallic basecoat materials BC-1, BC-5 to BC-8, BC-9, BC-12 to BC-16, BC-17, and BC-20 to BC-24, first of all a millbase ML-0 is prepared by mixing and homogenizing the following constituents:

10.0 parts by weight of the wax dispersion (W) described under 5., 22.0 parts by weight of the polymer microparticles (M) described under 3., 11.5 parts by weight of a commercial monomeric hexamethoxy-methyl/butyl-melamine resin, 8.0 parts by weight of the stabilized inorganic particles (N) described under 4., 0.5 part by weight of a commercial, silicone-free wetting additive based on an amine resin-modified acrylic copolymer, 0.8 part by weight of a commercial, hydroxyphenylbenzotriazole-based UV absorber, 16.0 parts by weight of the binder (AC) described under 1., 1.8 parts by weight of a commercial, amine-blocked dodecylbenzenesulfonic acid (DDBSA) catalyst, 3.0 parts by weight of the CAB solution (C) described under 9., 2.2 parts by weight of butyl acetate.

8.1. Preparation of a Comparative Metallic Basecoat Material BC-1 (p/b=0.13) without Polyester Binder The noninventive metallic basecoat material BC-1 was prepared by admixing 75.8 parts by weight of the millbase ML-0 from preparation example 8. with 10.0 parts by weight of the aluminum effect pigment (A) paste described under 6., adding 3.0 parts by weight of the acrylate binder (AC) described under 1., and adjusting the preparation with 11.2 parts by weight of butyl acetate to a spray viscosity of 23 seconds in the Ford 3 flow cup (23° C.). Thereafter the noninventive basecoat material BC-1 had a solids content of 40.2% by weight (1 h/125° C.).

8.2. Preparation of an Inventive Metallic Basecoat Material BC-2 (p/b=0.13) with Polyester Binder PE-1 (AN>20)

The inventive metallic basecoat material BC-2 was prepared by admixing 75.8 parts by weight of the millbase ML-0 from preparation example 8. with 10.0 parts by weight of the aluminum effect pigment (A) paste described under 6., adding 3.0 parts by weight of the polyester binder (PE-1) described under 2.1., and adjusting the preparation with 11.2 parts by weight of butyl acetate to a spray viscosity of 22 seconds in the Ford 3 flow cup (23° C.). Thereafter the inventive basecoat material BC-2 had a solids content of 40.2% by weight (1 h/125° C.).

8.3. Preparation of an Inventive Metallic Basecoat Material BC-3 (p/b=0.13) with Polyester Binder PE-2 (AN>20)

The inventive metallic basecoat material BC-3 was prepared by admixing 75.8 parts by weight of the millbase ML-0 from preparation example 8. with 10.0 parts by weight of the aluminum effect pigment (A) paste described under 6., adding 3.1 parts by weight of the polyester binder (PE-2) described under 2.2., and adjusting the preparation with 11.1 parts by weight of butyl acetate to a spray viscosity of 23 seconds in the Ford 3 flow cup (23° C.). Thereafter the inventive basecoat material BC-3 had a solids content of 40.2% by weight (1 h/125° C.).

8.4. Preparation of an Inventive Metallic Basecoat Material BC-4 (p/b=0.13) with Polyester Binder PE-3 (AN>20)

The inventive metallic basecoat material BC-4 was prepared by admixing 75.8 parts by weight of the millbase ML-0 from preparation example 8. with 10.0 parts by weight of the aluminum effect pigment (A) paste described under 6., adding 3.0 parts by weight of the polyester binder (PE-3) described under 2.3., and adjusting the preparation with 11.2 parts by weight of butyl acetate to a spray viscosity of 23 seconds in the Ford 3 flow cup (23° C.). Thereafter the inventive basecoat material BC-4 had a solids content of 40.2% by weight (1 h/125° C.).

8.5. Preparation of a Comparative Metallic Basecoat Material BC-5 (p/b=0.13) with Polyester Binder PE-4 (AN<20)

The noninventive metallic basecoat material BC-5 was prepared by admixing 75.8 parts by weight of the millbase ML-0 from preparation example 8. with 10.0 parts by weight of the aluminum effect pigment (A) paste described under 6., adding 3.7 parts by weight of the polyester binder (PE-4) described under 2.4., and adjusting the preparation with 10.5 parts by weight of butyl acetate to a spray viscosity of 23 seconds in the Ford 3 flow cup (23° C.). Thereafter the noninventive basecoat material BC-5 had a solids content of 40.2% by weight (1 h/125° C.).

8.6. Preparation of a Comparative Metallic Basecoat Material BC-6 (p/b=0.13) with Polyester Binder PE-5 (AN<20)

The noninventive metallic basecoat material BC-6 was prepared by admixing 75.8 parts by weight of the millbase ML-0 from preparation example 8. with 10.0 parts by weight of the aluminum effect pigment (A) paste described under 6., adding 3.7 parts by weight of the polyester binder (PE-5) described under 2.5., and adjusting the preparation with 10.8 parts by weight of butyl acetate to a spray viscosity of 23 seconds in the Ford 3 flow cup (23° C.). Thereafter the noninventive basecoat material BC-6 had a solids content of 40.2% by weight (1 h/125° C.).

8.7. Preparation of a Comparative Metallic Basecoat Material BC-7 (p/b=0.13) with Polyester Binder PE-6 (AN<20)

The noninventive metallic basecoat material BC-7 was prepared by admixing 75.8 parts by weight of the millbase ML-0 from preparation example 8. with 10.0 parts by weight of the aluminum effect pigment (A) paste described under 6., adding 3.5 parts by weight of the polyester binder (PE-6) described under 2.6., and adjusting the preparation with 11.6 parts by weight of butyl acetate to a spray viscosity of 23 seconds in the Ford 3 flow cup (23° C.). Thereafter the noninventive basecoat material BC-7 had a solids content of 40.2% by weight (1 h/125° C.).

8.8. Preparation of a Comparative Metallic Basecoat Material BC-8 (p/b=0.13) with Polyester Binder PE-7 (AN<20)

The noninventive metallic basecoat material BC-8 was prepared by admixing 75.8 parts by weight of the millbase ML-0 from preparation example 8. with 10.0 parts by weight of the aluminum effect pigment (A) paste described under 6., adding 2.6 parts by weight of the polyester binder (PE-7) described under 2.7., and adjusting the preparation with 11.7 parts by weight of butyl acetate to a spray viscosity of 23 seconds in the Ford 3 flow cup (23° C.). Thereafter the noninventive basecoat material BC-8 had a solids content of 40.2% by weight (1 h/125° C.).

8.9. Preparation of a Comparative Metallic Basecoat Material BC-9 (p/b=0.17) without Polyester Binder The noninventive metallic basecoat material BC-9 was prepared by admixing 75.8 parts by weight of the millbase ML-0 from preparation example 8. with 14.0 parts by weight of the aluminum effect pigment (A) paste described under 6., adding 3.0 parts by weight of the acrylate binder (AC) described under 1., and adjusting the preparation with 6.2 parts by weight of butyl acetate to a spray viscosity of 23 seconds in the Ford 3 flow cup (23° C.). Thereafter the noninventive basecoat material BC-9 had a solids content of 41.6% by weight (1 h/125° C.).

8.10. Preparation of an Inventive Metallic Basecoat Material BC-10 (p/b=0.17) with Polyester Binder PE-1 (AN>20)

The inventive metallic basecoat material BC-10 was prepared by admixing 75.8 parts by weight of the millbase ML-0 from preparation example 8. with 14.0 parts by weight of the aluminum effect pigment (A) paste described under 6., adding 3.0 parts by weight of the polyester binder (PE-1) described under 2.1., and adjusting the preparation with 6.2 parts by weight of butyl acetate to a spray viscosity of 23 seconds in the Ford 3 flow cup (23° C.). Thereafter the inventive basecoat material BC-10 had a solids content of 41.6% by weight (1 h/125° C.).

8.11. Preparation of an Inventive Metallic Basecoat Material BC-11 (p/b=0.17) with Polyester Binder PE-2 (AN>20)

The inventive metallic basecoat material BC-11 was prepared by admixing 75.8 parts by weight of the millbase ML-0 from preparation example 8. with 14.0 parts by weight of the aluminum effect pigment (A) paste described under 6., adding 3.1 parts by weight of the polyester binder (PE-2) described under 2.2., and adjusting the preparation with 6.1 parts by weight of butyl acetate to a spray viscosity of 23 seconds in the Ford 3 flow cup (23° C.). Thereafter the inventive basecoat material BC-11 had a solids content of 41.6% by weight (1 h/125° C.).

8.12. Preparation of an Inventive Metallic Basecoat Material BC-12 (p/b=0.17) with Polyester Binder PE-3 (AN>20)

The inventive metallic basecoat material BC-12 was prepared by admixing 75.8 parts by weight of the millbase ML-0 from preparation example 8. with 14.0 parts by weight of the aluminum effect pigment (A) paste described under 6., adding 3.0 parts by weight of the polyester binder (PE-3) described under 2.3., and adjusting the preparation with 6.2 parts by weight of butyl acetate to a spray viscosity of 23 seconds in the Ford 3 flow cup (23° C.). Thereafter the inventive basecoat material BC-12 had a solids content of 41.6% by weight (1 h/125° C.).

8.13. Preparation of a Comparative Metallic Basecoat Material BC-13 (p/b=0.17) with Polyester Binder PE-4 (AN<20)

The noninventive metallic basecoat material BC-13 was prepared by admixing 75.8 parts by weight of the millbase ML-0 from preparation example 8. with 14.0 parts by weight of the aluminum effect pigment (A) paste described under 6., adding 3.7 parts by weight of the polyester binder (PE-4) described under 2.4., and adjusting the preparation with 5.5 parts by weight of butyl acetate to a spray viscosity of 23 seconds in the Ford 3 flow cup (23° C.). Thereafter the noninventive basecoat material BC-13 had a solids content of 41.6% by weight (1 h/125° C.).

8.14. Preparation of a Comparative Metallic Basecoat Material BC-14 (p/b=0.17) with Polyester Binder PE-5 (AN<20)

The noninventive metallic basecoat material BC-14 was prepared by admixing 75.8 parts by weight of the millbase ML-0 from preparation example 8. with 14.0 parts by weight of the aluminum effect pigment (A) paste described under 6., adding 3.7 parts by weight of the polyester binder (PE-5) described under 2.5., and adjusting the preparation with 5.7 parts by weight of butyl acetate to a spray viscosity of 23 seconds in the Ford 3 flow cup (23° C.). Thereafter the noninventive basecoat material BC-14 had a solids content of 41.6% by weight (1 h/125° C.).

8.15. Preparation of a Comparative Metallic Basecoat Material BC-15 (p/b=0.17) with Polyester Binder PE-6 (AN<20)

The noninventive metallic basecoat material BC-15 was prepared by admixing 75.8 parts by weight of the millbase ML-0 from preparation example 8. with 14.0 parts by weight of the aluminum effect pigment (A) paste described under 6., adding 3.5 parts by weight of the polyester binder (PE-6) described under 2.6., and adjusting the preparation with 6.6 parts by weight of butyl acetate to a spray viscosity of 23 seconds in the Ford 3 flow cup (23° C.). Thereafter the noninventive basecoat material BC-15 had a solids content of 41.6% by weight (1 h/125° C.).

8.16. Preparation of a Comparative Metallic Basecoat Material BC-16 (p/b=0.17) with Polyester Binder PE-7 (AN<20)

The noninventive metallic basecoat material BC-16 was prepared by admixing 75.8 parts by weight of the millbase ML-0 from preparation example 8. with 14.0 parts by weight of the aluminum effect pigment (A) paste described under 6., adding 2.6 parts by weight of the polyester binder (PE-7) described under 2.7., and adjusting the preparation with 6.7 parts by weight of butyl acetate to a spray viscosity of 23 seconds in the Ford 3 flow cup (23° C.). Thereafter the noninventive basecoat material BC-16 had a solids content of 41.6% by weight (1 h/125° C.).

8.17. Preparation of a Comparative Metallic Basecoat Material BC-17 (p/b=0.21) without Polyester Binder The noninventive metallic basecoat material BC-17 was prepared by admixing 75.8 parts by weight of the millbase ML-0 from preparation example 8. with 18.0 parts by weight of the aluminum effect pigment (A) paste described under 6., adding 3.0 parts by weight of the acrylate binder (AC) described under 1., and adjusting the preparation with 1.2 parts by weight of butyl acetate to a spray viscosity of 23 seconds in the Ford 3 flow cup (23° C.). Thereafter the noninventive basecoat material BC-17 had a solids content of 43.0% by weight (1 h/125° C.).

8.18. Preparation of an Inventive Metallic Basecoat Material BC-18 (p/b=0.21) with Polyester Binder PE-1 (AN>20)

The inventive metallic basecoat material BC-18 was prepared by admixing 75.8 parts by weight of the millbase ML-0 from preparation example 8. with 18.0 parts by weight of the aluminum effect pigment (A) paste described under 6., adding 3.0 parts by weight of the polyester binder (PE-1) described under 2.1., and adjusting the preparation with 1.2 parts by weight of butyl acetate to a spray viscosity of 22 seconds in the Ford 3 flow cup (23° C.). Thereafter the inventive basecoat material BC-18 had a solids content of 43.0% by weight (1 h/125° C.).

8.19. Preparation of an Inventive Metallic Basecoat Material BC-19 (p/b=0.21) with Polyester Binder PE-2 (AN>20)

The inventive metallic basecoat material BC-19 was prepared by admixing 75.8 parts by weight of the millbase ML-0 from preparation example 8. with 18.0 parts by weight of the aluminum effect pigment (A) paste described under 6., adding 3.1 parts by weight of the polyester binder (PE-2) described under 2.2., and adjusting the preparation with 1.1 parts by weight of butyl acetate to a spray viscosity of 23 seconds in the Ford 3 flow cup (23° C.). Thereafter the inventive basecoat material BC-19 had a solids content of 43.0% by weight (1 h/125° C.).

8.20. Preparation of an Inventive Metallic Basecoat Material BC-20 (p/b=0.21) with Polyester Binder PE-3 (AN>20)

The inventive metallic basecoat material BC-20 was prepared by admixing 75.8 parts by weight of the millbase ML-0 from preparation example 8. with 18.0 parts by weight of the aluminum effect pigment (A) paste described under 6., adding 3.0 parts by weight of the polyester binder (PE-3) described under 2.3., and adjusting the preparation with 1.2 parts by weight of butyl acetate to a spray viscosity of 23 seconds in the Ford 3 flow cup (23° C.). Thereafter the inventive basecoat material BC-20 had a solids content of 43.0% by weight (1 h/125° C.).

8.21. Preparation of a Comparative Metallic Basecoat Material BC-21 (p/b=0.21) with Polyester Binder PE-4 (AN<20)

The noninventive metallic basecoat material BC-21 was prepared by admixing 75.8 parts by weight of the millbase ML-0 from preparation example 8. with 18.0 parts by weight of the aluminum effect pigment (A) paste described under 6., adding 3.7 parts by weight of the polyester binder (PE-4) described under 2.4., and adjusting the preparation with 0.5 part by weight of butyl acetate to a spray viscosity of 23 seconds in the Ford 3 flow cup (23° C.). Thereafter the noninventive basecoat material BC-21 had a solids content of 43.0% by weight (1 h/125° C.).

8.22. Preparation of a Comparative Metallic Basecoat Material BC-22 (p/b=0.21) with Polyester Binder PE-5 (AN<20)

The noninventive metallic basecoat material BC-22 was prepared by admixing 75.8 parts by weight of the millbase ML-0 from preparation example 8. with 18.0 parts by weight of the aluminum effect pigment (A) paste described under 6., adding 3.7 parts by weight of the polyester binder (PE-5) described under 2.5., and adjusting the preparation with 0.7 part by weight of butyl acetate to a spray viscosity of 23 seconds in the Ford 3 flow cup (23° C.). Thereafter the noninventive basecoat material BC-22 had a solids content of 43.0% by weight (1 h/125° C.).

8.23. Preparation of a Comparative Metallic Basecoat Material BC-23 (p/b=0.21) with Polyester Binder PE-6 (AN<20)

The noninventive metallic basecoat material BC-23 was prepared by admixing 75.8 parts by weight of the millbase ML-0 from preparation example 8. with 18.0 parts by weight of the aluminum effect pigment (A) paste described under 6., adding 3.5 parts by weight of the polyester binder (PE-6) described under 2.6., and adjusting the preparation with 1.6 parts by weight of butyl acetate to a spray viscosity of 23 seconds in the Ford 3 flow cup (23° C.). Thereafter the noninventive basecoat material BC-23 had a solids content of 43.0% by weight (1 h/125° C.).

8.24. Preparation of a Comparative Metallic Basecoat Material BC-24 (p/b=0.21) with Polyester Binder PE-7 (AN<20)

The noninventive metallic basecoat material BC-24 was prepared by admixing 75.8 parts by weight of the millbase ML-0 from preparation example 8. with 18.0 parts by weight of the aluminum effect pigment (A) paste described under 6., adding 2.6 parts by weight of the polyester binder (PE-7) described under 2.7., and adjusting the preparation with 1.7 parts by weight of butyl acetate to a spray viscosity of 23 seconds in the Ford 3 flow cup (23° C.). Thereafter the noninventive basecoat material BC-24 had a solids content of 43.0% by weight (1 h/125° C.).

9. Determination of the ESTA Hiding Power of the Metallic Basecoat Materials BC1 to BC24

The metallic basecoat materials BC-1 to BC-24 were applied to coil-coated test panels of dimensions 30×60 cm by double ESTA coating in a wedge over a film thickness range between 1 μm and 25 μm. Subsequently the basecoat films were flashed off for 5 minutes. Thereafter the basecoat films were baked at a panel temperature of 140° C. for 10 minutes and the hiding power (HP) was determined visually by means of a B/W monitor.

The metallic basecoat materials BC-1 to BC-8, with a p/b ratio of 0.15, gave a hiding power of 17-19 μm; the metallic basecoat materials BC-9 to BC-16 with a p/b ratio of 0.18 gave a hiding power of 14-16 μm; and the metallic basecoat materials BC-17 to BC-24 with a p/b ratio of 0.21 gave a hiding power of 11-13 μm.

The individual results are summarized in table 1:

TABLE 1

ESTA hiding powers of metallic basecoat materials BC-1 to BC-24.

| p/b = 0.13 | Esta HP | p/b = 0.17 | Esta HP | p/b = 0.21 | Esta HP |
| --- | --- | --- | --- | --- | --- |
| BC-1 | 18 μm | BC-9 | 15 μm | BC-17 | 12 μm |
| BC-2 | 17 μm | BC-10 | 14 μm | BC-18 | 11 μm |
| BC-3 | 18 μm | BC-11 | 16 μm | BC-19 | 12 μm |
| BC-4 | 19 μm | BC-12 | 15 μm | BC-20 | 13 μm |
| BC-5 | 18 μm | BC-13 | 14 μm | BC-21 | 12 μm |
| BC-6 | 17 μm | BC-14 | 15 μm | BC-22 | 11 μm |
| BC-7 | 18 μm | BC-15 | 16 μm | BC-23 | 11 μm |
| BC-8 | 19 μm | BC-16 | 14 μm | BC-24 | 13 μm |

10. Production of Multicoat Paint Systems O-1 to O-24 in an Original-Finish System and R-1 to R-24 in a Refinish System To test the technological properties of the original finishes of example coating materials BC-1 to BC-24, test panels with dimensions of 10×20 cm were produced in a conventional way. This was done by coating cathodically electrocoated panels with a commercial, conventional, gray, polyester-based surfacer from BASF Coatings AG, after which the resulting surfacer films were flashed off for 5 minutes at 20° C. and a relative humidity of 65% and baked in a forced-air oven at a panel temperature of 165° C. for 5 minutes.

After the test panels had cooled to 20° C., in a first series the basecoat materials BC-1 to BC-24 were applied by automatic electrostatic spray application (ESTA) with a dry film thickness of 11-19 μm corresponding to the respective hiding power. Subsequently the basecoat films were flashed off for 5 minutes and recoated with a commercial high-solids one-component clearcoat material from BASF Coatings AG, with a dry film thickness of 40-50 μm. Thereafter the basecoat films and clearcoat films were baked at a panel temperature of 140° C. for 10 minutes. This gave the original finishes O-1 to O-24.

For testing the technological properties of the refinishes of the example coating materials BC-1 to BC-24, a series of the above-described original finishes O-1 to O-24 was again coated by means of automatic electrostatic spray application (ESTA) with the example coating materials BC-1 to BC-24, with a dry film thickness of 11-19 μm corresponding to the respective hiding power. Subsequently the basecoat films were flashed off for 5 minutes and recoated with a commercial high-solids one-component clearcoat material from BASF Coatings AG, with a dry film thickness of 40-50 μm. Thereafter the basecoat films and the clearcoat films were baked at a panel temperature of 140° C. for 10 minutes. This gave the refinishes R-1 to R-24.

Table 2 summarizes the multicoat constructions of the original finishes and refinishes of comparative paint systems 1, 5-9, 13-17, and 21-24 and also of inventive paint systems 2-4, 10-12, and 18-20.

TABLE 2

Multicoat paint systems O-1 to O-24, original-finish system, and R-1 to R-24, refinish system.

| Multicoat paint system | Metallic basecoat material | p/b | Basecoat film thickness |
| --- | --- | --- | --- |
| O-1 or R-1 | BC-1 | 0.13 | 17-19 μm |
| O-2 or R-2 | BC-2 | 0.13 | 17-19 μm |
| O-3 or R-3 | BC-3 | 0.13 | 17-19 μm |
| O-4 or R-4 | BC-4 | 0.13 | 17-19 μm |
| O-5 or R-5 | BC-5 | 0.13 | 17-19 μm |
| O-6 or R-6 | BC-6 | 0.13 | 17-19 μm |
| O-7 or R-7 | BC-7 | 0.13 | 17-19 μm |
| O-8 or R-8 | BC-8 | 0.13 | 17-19 μm |
| O-9 or R-9 | BC-9 | 0.17 | 14-16 μm |
| O-10 or R-10 | BC-10 | 0.17 | 14-16 μm |
| O-11 or R-11 | BC-11 | 0.17 | 14-16 μm |
| O-12 or R-12 | BC-12 | 0.17 | 14-16 μm |
| O-13 or R-13 | BC-13 | 0.17 | 14-16 μm |
| O-14 or R-14 | BC-14 | 0.17 | 14-16 μm |
| O-15 or R-15 | BC-15 | 0.17 | 14-16 μm |
| O-16 or R-16 | BC-16 | 0.17 | 14-16 μm |
| O-17 or R-17 | BC-17 | 0.21 | 11-13 μm |
| O-18 or R-18 | BC-18 | 0.21 | 11-13 μm |
| O-19 or R-19 | BC-19 | 0.21 | 11-13 μm |
| O-20 or R-20 | BC-20 | 0.21 | 11-13 μm |
| O-21 or R-21 | BC-21 | 0.21 | 11-13 μm |
| O-22 or R-22 | BC-22 | 0.21 | 11-13 μm |
| O-23 or R-23 | BC-23 | 0.21 | 11-13 μm |
| O-24 or R-24 | BC-24 | 0.21 | 11-13 μm |

11. Testing of the Multicoat Paint Systems Obtained

The intercoat adhesion of the multicoat paint systems produced by the method indicated in section 10. was tested by the cross-cut test of Ford test method BI 106-01. The evaluation scale for the cross-cut testing in accordance with Ford test method BI 106-01 spans a range of 0-10, with an evaluation >2 pointing to a potential adhesion problem.

The stonechip resistance of the multicoat paint systems was tested in accordance with Ford test method BI 157-06. The evaluation scale for the stonechip testing in accordance with Ford test method BI 157-06 spans a range of 1-10, with an evaluation <4 pointing to a deficient stonechip resistance.

Table 3 summarizes the individual results.

TABLE 3

Results of the cross-cut and stonechip tests on multicoat paint systems O-1 to O-24, original finish, and R-1 to R-24, refinish.

| Multicoat paint system | Metallic basecoat material | p/b | Basecoat film thickness | Cross-cut Orig. | Cross-cut Refin. | Stonechip Orig. | Stonechip Refin. |
| --- | --- | --- | --- | --- | --- | --- | --- |
| O-1 or R-1 | BC-1 | 0.13 | 17-19 μm | 1 | 1 | 6 | 4 |
| O-2 or R-2 | BC-2 | 0.13 | 17-19 μm | 0 | 0 | 8 | 7 |

TABLE 3-continued

Results of the cross-cut and stonechip tests on multicoat paint systems O-1 to O-24, original finish, and R-1 to R-24, refinish.

| Multicoat paint system | Metallic basecoat material | p/b | Basecoat film thickness | Cross-cut Orig. | Cross-cut Refin. | Stonechip Orig. | Stonechip Refin. |
|---|---|---|---|---|---|---|---|
| O-3 or R-3 | BC-3 | 0.13 | 17-19 μm | 0 | 0 | 7 | 6 |
| O-4 or R-4 | BC-4 | 0.13 | 17-19 μm | 0 | 0 | 8 | 7 |
| O-5 or R-5 | BC-5 | 0.13 | 17-19 μm | 1 | 1 | 6 | 5 |
| O-6 or R-6 | BC-6 | 0.13 | 17-19 μm | 0 | 1 | 6 | 5 |
| O-7 or R-7 | BC-7 | 0.13 | 17-19 μm | 1 | 1 | 6 | 5 |
| O-8 or R-8 | BC-8 | 0.13 | 17-19 μm | 1 | 1 | 6 | 5 |
| O-9 or R-9 | BC-9 | 0.17 | 14-16 μm | 1 | 1-2 | 4 | 2-3 |
| O-10 or R-10 | BC-10 | 0.17 | 14-16 μm | 0 | 0 | 6 | 5 |
| O-11 or R-11 | BC-11 | 0.17 | 14-16 μm | 0 | 0 | 5-6 | 4-5 |
| O-12 or R-12 | BC-12 | 0.17 | 14-16 μm | 0 | 0 | 5 | 4-5 |
| O-13 or R-13 | BC-13 | 0.17 | 14-16 μm | 1 | 1-2 | 4-5 | 3 |
| O-14 or R-14 | BC-14 | 0.17 | 14-16 μm | 1 | 1-2 | 4 | 3 |
| O-15 or R-15 | BC-15 | 0.17 | 14-16 μm | 1 | 1-2 | 4-5 | 3 |
| O-16 or R-16 | BC-16 | 0.17 | 14-16 μm | 1 | 1-2 | 4 | 2-3 |
| O-17 or R-17 | BC-17 | 0.21 | 11-13 μm | 1 | 2 | 2 | 1 |
| O-18 or R-18 | BC-18 | 0.21 | 11-13 μm | 1 | 2 | 5 | 4 |
| O-19 or R-19 | BC-19 | 0.21 | 11-13 μm | 1 | 2 | 5 | 4 |
| O-20 or R-20 | BC-20 | 0.21 | 11-13 μm | 1 | 2 | 5 | 4 |
| O-21 or R-21 | BC-21 | 0.21 | 11-13 μm | 2 | 2 | 2 | 1-2 |
| O-22 or R-22 | BC-22 | 0.21 | 11-13 μm | 1 | 2 | 2-3 | 2 |
| O-23 or R-23 | BC-23 | 0.21 | 11-13 μm | 1 | 2 | 2 | 2 |
| O-24 or R-24 | BC-24 | 0.21 | 11-13 μm | 1 | 2 | 2-3 | 2 |

By reducing the basecoat film thickness from 17-19 μm to 11-13 μm it is possible to reduce the VOC emissions of the coating operation. For other properties, such as process stability, hue stability, and substrate masking, not to become poorer, it is necessary to raise the level of pigmentation of the coating compositions. One measure of this is the pigment/binder ratio (p/b). The higher the p/b, the higher the pigment content in the basecoat formulation. In the case of the conventional, noninventive paint systems, increased pigmentation levels and reduced film thickness led to a distinct deterioration in adhesion and also, in particular, in stonechip resistance.

The inventive multicoat paint systems in an original-finish system O-2/3/4/10/11/12/18/19/20 and also in a refinish system R-2/3/4/10/11/12/18/19/20, produced from the inventive metallic basecoat materials BC-2, BC-3, and BC-4, containing the polyester binders PE-1, PE-2, and PE-3, which have an acid number AN of >20 mg KOH/g, based in each case on the respective determined solids content, pass the cross-cut test of Ford test method BI 106-01 and also the stonechip test of Ford test method BI 157-06, both as original finishes and as refinishes. In particular the multicoat paint systems of the invention, even with a low film thickness, feature not only good hiding power but also good adhesion and good stonechip resistance.

Adhesion and stonechip resistance of the paint systems of the invention are significantly better than adhesion and stonechip resistance for the noninventive paint systems.

The noninventive multicoat paint systems O-9/R-9, and also O-13 to O-17 and R-13 to R-17, with a p/b of 0.13 and a hiding power of between 14 and 16 μm, and also, in particular, the noninventive multicoat paint systems O-17/R-17, and also O-21 to O-24 and R-21 to R-24, with a p/b of 0.16 and a hiding power between 11 and 13 μm, do not meet the requirements of the Ford specification adhesion tests. The noninventive multicoat paint systems whose basecoat material contains either no polyester binder or a polyester binder having an acid number of <20 mg KOH/g display poorer adhesion and in particular a poorer stonechip resistance than the paint systems of the invention.

What is claimed is:

1. A waterless high-solids basecoat material having a solids content of at least 35% by weight, comprising
   (a) 1% to 6% by weight of at least one polyester binder which has an acid number of greater than 20 mg KOH/g,
   (b) 10% to 30% by weight of at least one acrylate binder,
   (c) 9.5% to 30% by weight of at least one crosslinking agent which is selected from the group consisting of free isocyanates, blocked isocyanates, and amino resins,
   (d) 1% to 3% by weight of at least one sulfonic acid catalyst,
   (e) 1% to 3 5% by weight of at least one pigment,
   (f) 30% to 65% by weight of at least one organic solvent, and
   (g) 0.5% to 47% by weight of at least one auxiliary or additive, based in each case on the total weight of the basecoat material.

2. The basecoat material of claim 1, wherein the solids content of the basecoat material is at least 40% by weight.

3. The basecoat material of claim 1, wherein the sulfonic acid catalyst (d) is a blocked sulfonic acid catalyst.

4. The basecoat material of claim 1, wherein the polyester binder comprises structural units which originate from aliphatic, cycloaliphatic and/or aromatic dicarboxylic and/or polycarboxylic acids and from diols and/or polyols.

5. The basecoat material of claim 1, wherein the polyester binder has a weight-average molecular weight of 400 to 6000 g/mol.

6. A metallic or plastics substrate coated with at least one high-solids basecoat material as claimed in claim 1.

7. A metallic or plastics substrate of claim 6, coated with a multicoat paint system as claimed in claim 1.

8. The basecoat material of claim 1, comprising 3% to 6% by weight, based in each case on the total weight of the basecoat material, of said at least one polyester binder.

9. The basecoat material of claim 1, wherein the acrylate binder is selected from (meth)acrylate (co)polymers and derivatives obtained from (meth)acrylate (co)polymers by polymer-analogous reactions.

10. The basecoat material of claim 1, wherein the acrylate binder comprises thio, hydroxyl, N-methylolamino, N-alkoxymethylamino, imino, carbamate, allophanate and/or carboxyl groups.

11. The basecoat material of claim 1, comprising 2% to 6% by weight, based in each case on the total weight of the basecoat material, of said at least one polyester binder.

12. A process for preparing a waterless high-solids basecoat material as claimed in claim 1, which comprises mixing the constituents with one another and homogenizing the mixture.

13. A multicoat paint system comprising at least one basecoat of a waterless high-solids basecoat material as claimed in claim 1 and at least one clearcoat.

14. The multicoat paint system of claim 13, wherein the dry film thickness of the basecoat is 10-20 μm.

15. The multicoat paint system of claim 13, which comprises precisely one basecoat and precisely one clearcoat.

16. The multicoat paint system of claim 14, wherein the dry film thickness of the basecoat is 10-16 μm.

17. The multicoat paint system of claim 14, wherein the dry film thickness of the basecoat is 11-13 μm.

18. A process of producing a multicoat paint system, comprising applying the waterless high-solids basecoat material of claim 1 to a substrate.

19. A process for producing a multicoat paint system which comprises applying, in this order—
   a. first at least one waterless high-solids basecoat material as claimed in claim 1, and subsequently
   b. at least one clearcoat material—
to an optionally precoated substrate.

20. The process of claim 19, wherein the clearcoat material has a solids fraction of at least 40% by weight.

* * * * *